United States Patent [19]

Calvignac et al.

[11] Patent Number: 5,333,269
[45] Date of Patent: Jul. 26, 1994

[54] MECHANISM FOR TRANSFERRING MESSAGES BETWEEN SOURCE AND DESTINATION USERS THROUGH A SHARED MEMORY

[75] Inventors: Jean Calvignac, LaGaude; Jean-Pierre Lips, Cagnes-sur-Mer; Jean-Marc Millet, Vence; Jean-Marie Munier, Cagnes-sur-Mer; Bernard Naudin, LaGaude, all of France

[73] Assignee: International Business Machines Corporation, Armonk, N.Y.

[21] Appl. No.: 965,554

[22] Filed: Oct. 23, 1992

Related U.S. Application Data

[63] Continuation of Ser. No. 416,165, Oct. 2, 1989, abandoned.

[30] Foreign Application Priority Data

Oct. 28, 1988 [EP] European Pat. Off. ........ 88480067.3

[51] Int. Cl.⁵ ............................................. H04L 12/40
[52] U.S. Cl. ..................... 395/200; 395/325; 364/DIG. 1; 364/228.1; 364/244; 364/244.3; 364/242.6; 364/242.92; 364/251.5; 364/254.5; 364/254.6
[58] Field of Search ................... 395/200, 250, 325

[56] References Cited

U.S. PATENT DOCUMENTS

| | | | |
|---|---|---|---|
| 4,015,243 | 3/1977 | Kurpanek et al. | 340/172.5 |
| 4,062,059 | 12/1977 | Suzuki et al. | 295/250 |
| 4,214,305 | 7/1980 | Tokita et al. | 395/325 |
| 4,371,929 | 2/1983 | Brann et al. | 364/200 |
| 4,392,200 | 6/1983 | Arulpragasam et al. | 364/200 |
| 4,404,628 | 9/1983 | Angelo | 364/200 |
| 4,418,382 | 11/1983 | Larson et al. | 364/200 |
| 4,426,679 | 1/1984 | Yu et al. | 364/200 |
| 4,509,119 | 4/1985 | Gumaer et al. | 395/250 |
| 4,682,284 | 6/1987 | Schrofer | 395/425 |
| 4,695,943 | 9/1987 | Keeley et al. | 364/200 |
| 4,807,111 | 2/1989 | Cohen et al. | 364/200 |
| 4,949,240 | 8/1990 | Iijima | 395/425 |
| 5,167,020 | 11/1992 | Kahn et al. | 395/250 |
| 5,230,078 | 7/1993 | Varela et al. | 455/67.1 |

OTHER PUBLICATIONS

IBM TDB, vol. 23, No. 7A, Dec. 1980, pp. 3059–3061.
IBM System/370 Extended Architecture, pub. No. SA22-7085-0.
IEEE Trans. on Nuclear Science, vol. NS-29, No. 1, Feb. 1982, pp. 314–318.
4th Euromicro Sym. on Microprocessing & Microprogramming, Oct. 1978, pp. 257–267.

Primary Examiner—Dale M. Shaw
Assistant Examiner—Lance L. Barry
Attorney, Agent, or Firm—Joscelyn G. Cockburn

[57] ABSTRACT

A device for interconnecting source users and destination users includes a common bus to which a memory with a plurality of independent buffers, a memory interface (22) and a central control apparatus (26) are connected. The memory interface (22) receives messages from source users, stores the messages in selected buffers and chains the buffers together. The central control apparatus generates inbound message queues and outbound message queues in response to commands which it receives from the memory interface.

1 Claim, 33 Drawing Sheets

FIG. 5
B C B  (BUFFER CONTROL BLOCK)
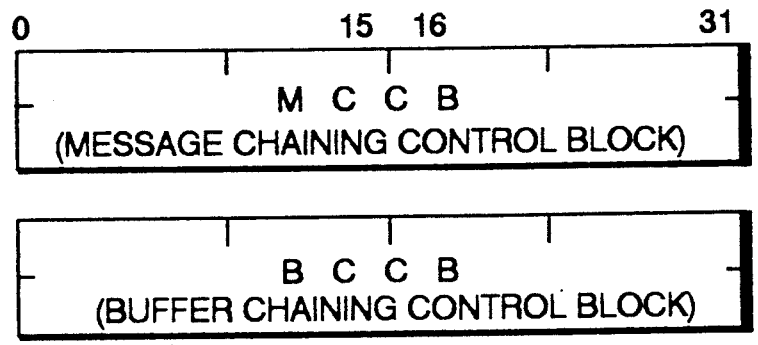
M C C B  (MESSAGE CHAINING CONTROL BLOCK)
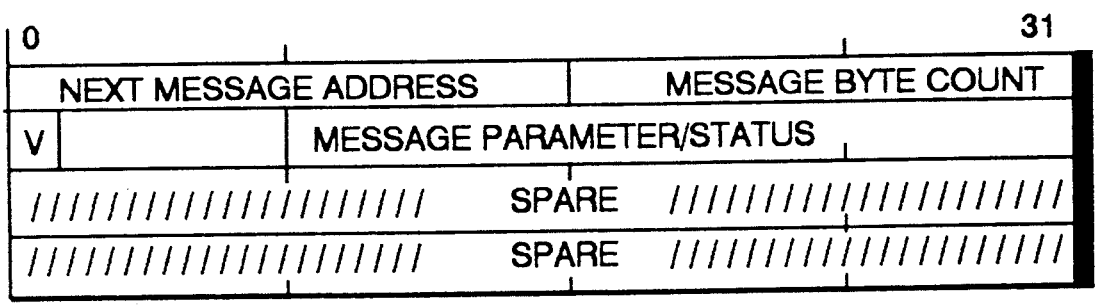
B C C B  (BUFFER CHAINING CONTROL BLOCK)
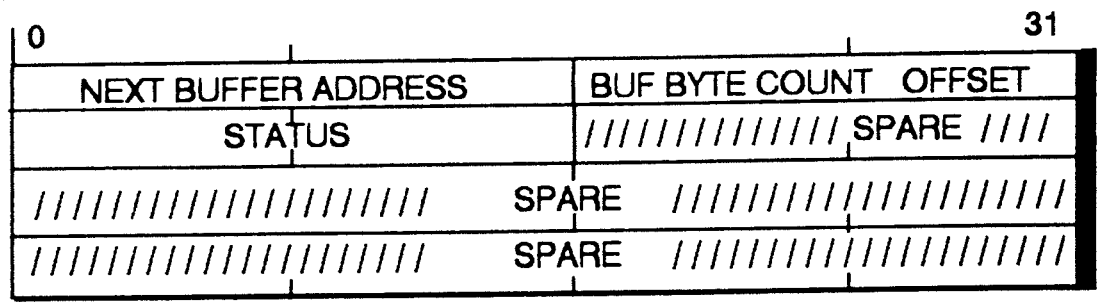

MESSAGE QUEUE CONTROL BLOCK (MQCB) FORMAT

FREE BUFFER QUEUE CONTROL BLOCK FORMAT

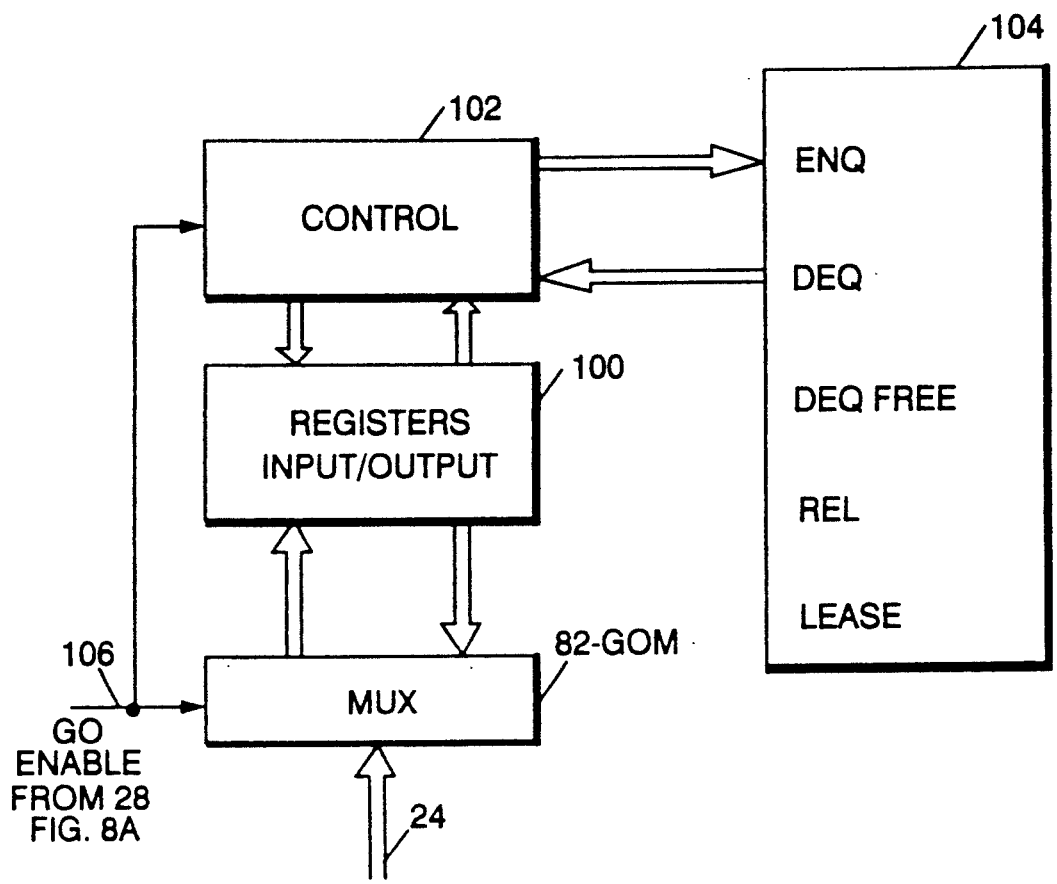
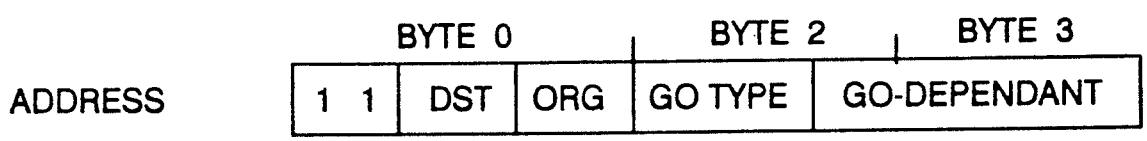
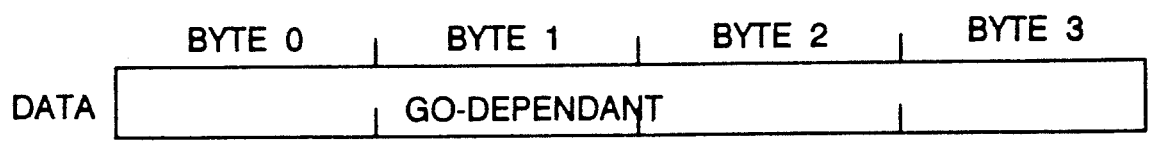
GLOBAL ORDER REQUEST/RESPONSE FORMAT.
DST/ORG: DESTINATION/ORIGIN FIELD
GO TYPE: GLOBAL ORDER TYPE.
FIG. 9

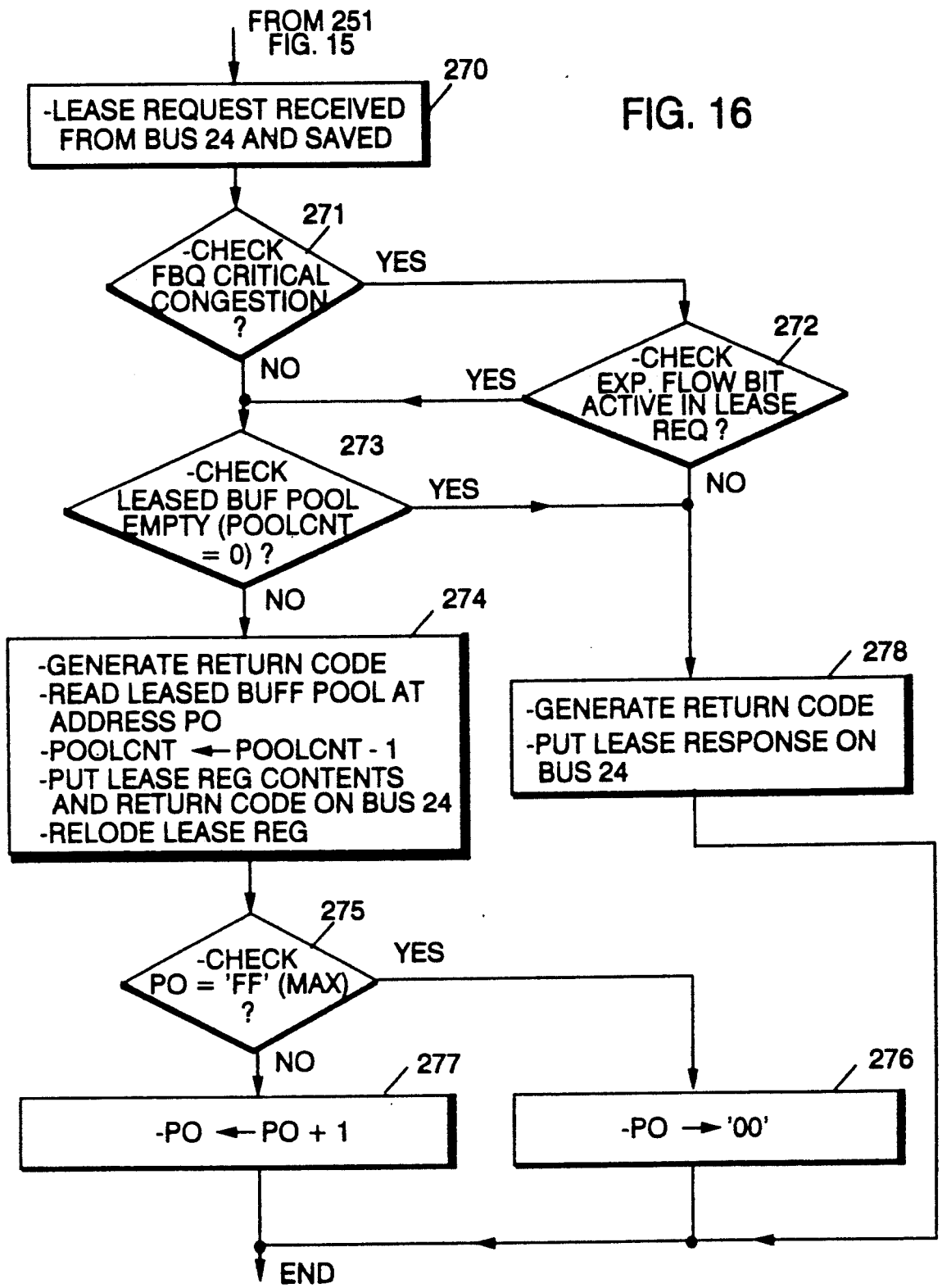

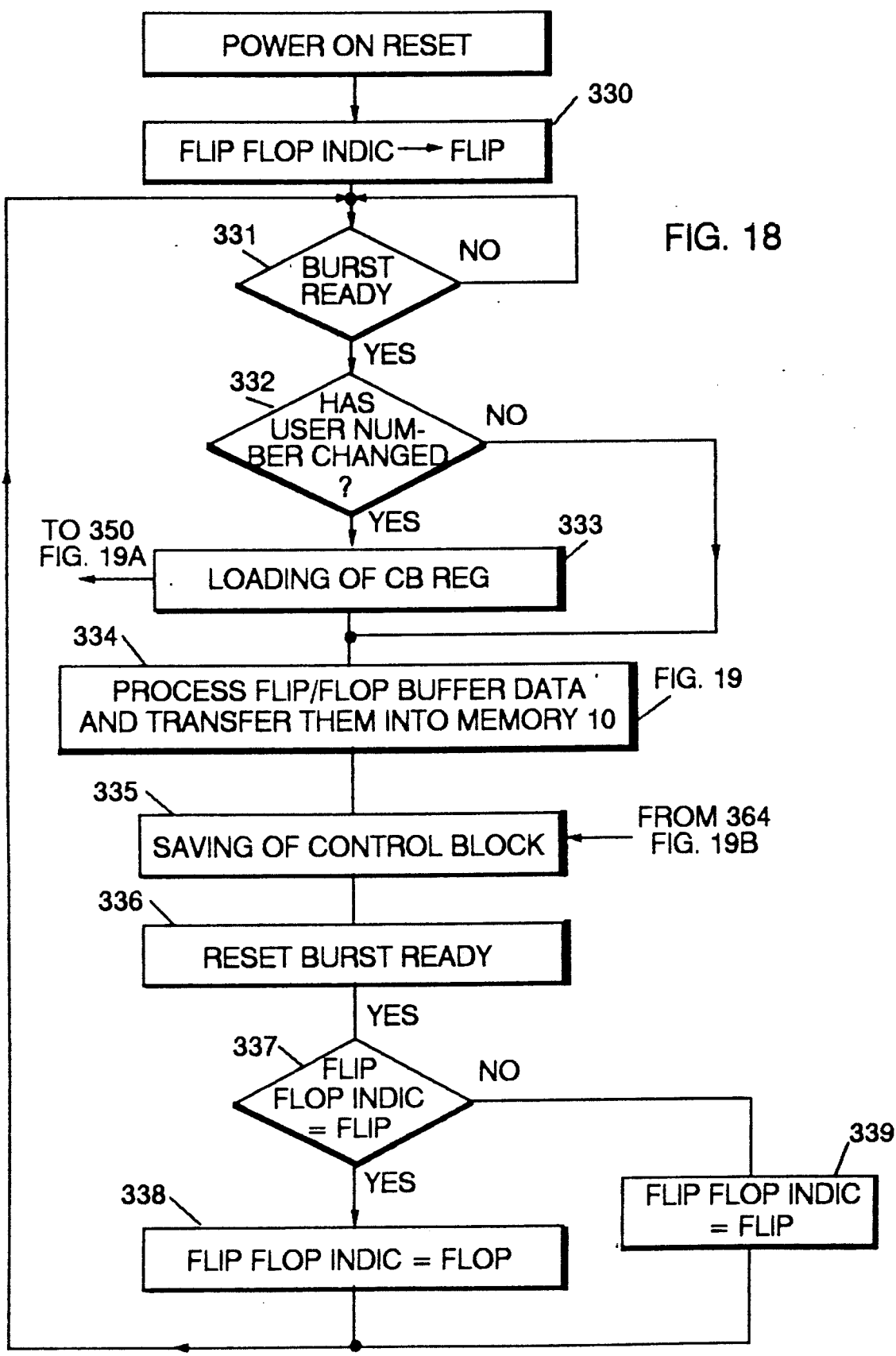

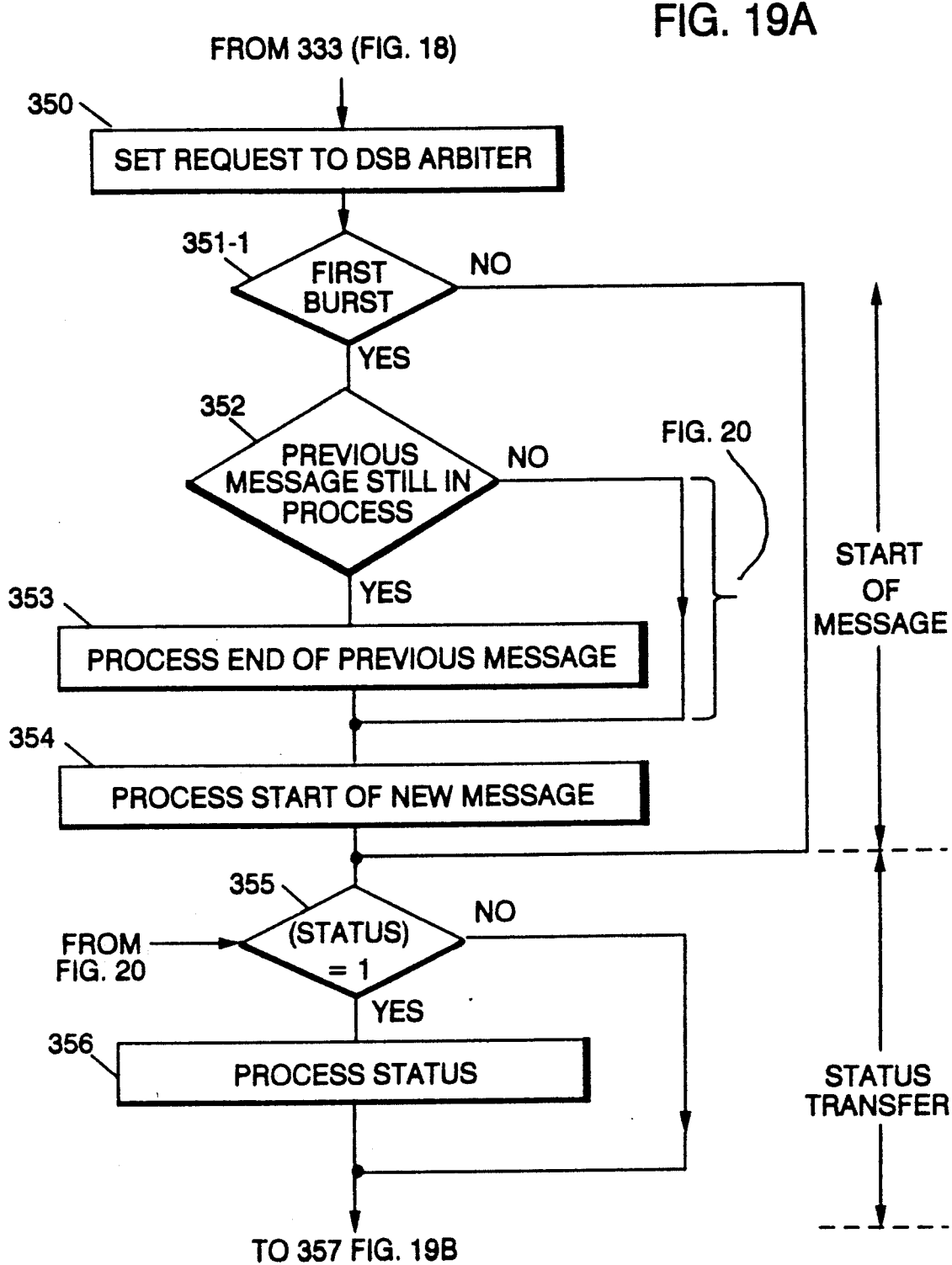

MECHANISM FOR TRANSFERRING MESSAGES BETWEEN SOURCE AND DESTINATION USERS THROUGH A SHARED MEMORY

This application is a continuation of Ser. No. 07/416,165, filed Oct. 2, 1989 and now abandoned.

DESCRIPTION OF THE INVENTION

1. Field of the invention

The present invention relates to a mechanism for managing a memory shared between a number of users, so that the users may exchange messages through the memory, in a proficient way.

2. Background art

In a communication network, the control systems located at the network node have to perform at least the functions which are defined as the three first layers of the reference models, namely the physical layer, the data link control layer and the network control layer.

In the future, these systems will have to service more and more users through high speed links. A system provided with the capability of servicing high speed communication (through a high speed adapter) is described in Patent Application EP-A-244,544. It comprises a central control unit running a network control program which assigns buffers of the central control unit memory to the user links. The high speed adapter is provided with buffering means into which the data portion of the received frames are assembled to be stored into the memory of the central control unit through a direct memory access path. The control portions of the received frame are provided to the central control unit through the adapter microprocessor through the input/output bus connecting the central control unit and the adapters.

The performance of such a system is limited by two factors: firstly the messages have to be managed by the microcode and secondly it is not possible to directly exchange messages between the adapters without the intervention of the central control unit.

SUMMARY OF THE INVENTION

An object of the present invention is to provide a mechanism to be implemented in a communication network node, allowing messages to be exchanged between the adapters of any type without intervention of a costly central control unit.

Another object of the present invention is to provide such a mechanism which allows messages comprising any received sequence of short size messages to be exchanged, without risk of overrun conditions.

The mechanism according to the subject invention allows messages to be transferred between source users and destination users in a communication system through a memory organized in pages, said memory being shared by the users and accessed by the users through a common bus.

The shared memory is organized in a buffered space and in a linear space. Each memory page of the buffered space comprises data buffers of equal capacity. To each data buffer is associated a buffer control block which is devoted to the storing of information relative to the associated data/buffer. The linear space comprises queue control blocks (QCB) with each one of the queue control block dedicated to an assigned source or destination user.

Inbound message queues (LIQ) are built in the buffered space by receiving the messages from the source users and storing them in free data buffers taken from the buffered space, chaining the buffers of the queues by writing information indicative of the next buffer address, and of the next message address of the queues.

An information indicative of the queue heads and of the queue tails is written in the queue control blocks assigned to the corresponding source users.

The queue control blocks of the source users are read and the information read from this block is used to modify the queue control blocks of the destination users, whereby outbound message queues (LOQ) are built by enqueuing the buffers of the sources users onto said outbound message queues, which is done by updating the buffer control block of the last buffer of the queue, the content of the queues is read to be transferred to the destination users.

In particular the memory comprises a linear space and a buffered space, each page of the buffer space is divided in a number m+1 of buffers of equal capacity, with m buffers devoted to the storage of data and one control buffer divided into m control blocks. There is a fixed relationship between one buffer control block and one data buffer. The control blocks are devoted to the storage of buffer and message chaining information. The linear space comprises queue control blocks, with one queue control block per user. The messages are received by memory interface 22 from the source users and then are enqueued in link inbound queues (LIQ) which are dynamically built by taking buffers from the buffered space, chaining information in the corresponding buffer control blocks and writing the queue head and queue tail addresses in the user queue control block. A centralized control means is designed to process enqueue, dequeue and release orders upon requests from a user selected by an arbitrating means. When a link inbound queue becomes not empty, the memory interface 22 sends a dequeue order request to the centralized control means, said request identifying the corresponding user queue control block. The message address is provided in response thereto with the identification of the queue control block of the destination user. Then, the memory interface 22 sends and enqueue request to the centralized control means, said request identifying the address of the message to be enqueued and the queue control block of the destination user. The processing of this enqueue request by the centralized control means causes the messages to be enqueued in an outbound queue from which it is transferred to the destination user, by memory interface 22.

BRIEF DESCRIPTION OF THE FIGURES

FIG. 5 shows the buffer control block fields.

FIG. 8A represents Global Order Machine (GOM) 90.

FIG. 9 represents the Global Order Request/Response Format.

FIG. 16 shows the functions performed by control logic 202 for processing a lease global order.

FIG. 18 shows the functions performed by logic 306 and 308 for receiving data bursts.

FIGS. 19A and 19B show in more details the functions performed in step 334 of FIG. 18.

DETAILED DESCRIPTION OF THE INVENTION

Figure 1:
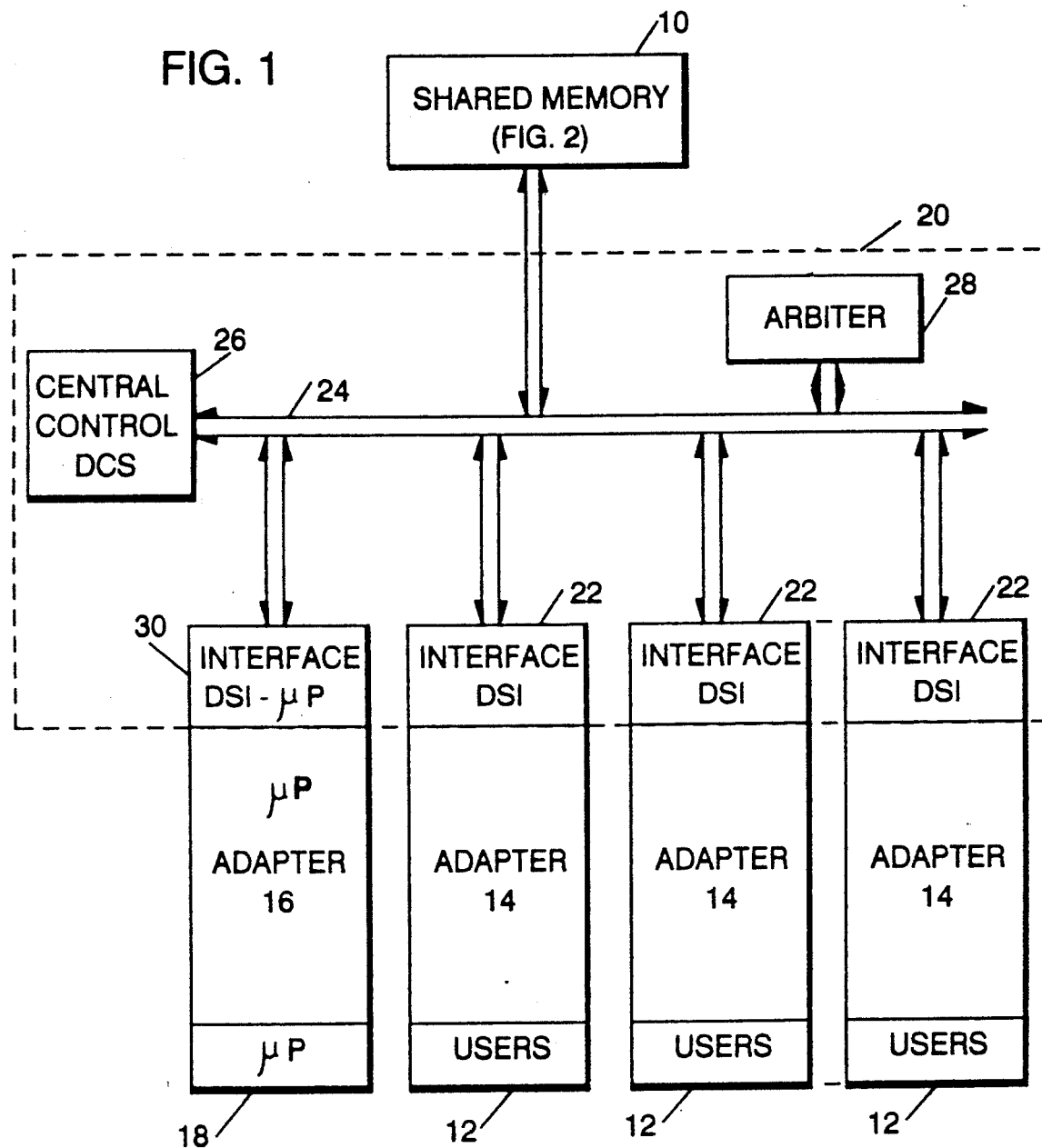
FIG. 1 shows the general arrangement of a communication system incorporating the present invention.

FIG. 1 shows the block diagram of a communication system incorporating the mechanism according to the present invention.

Figure 2:
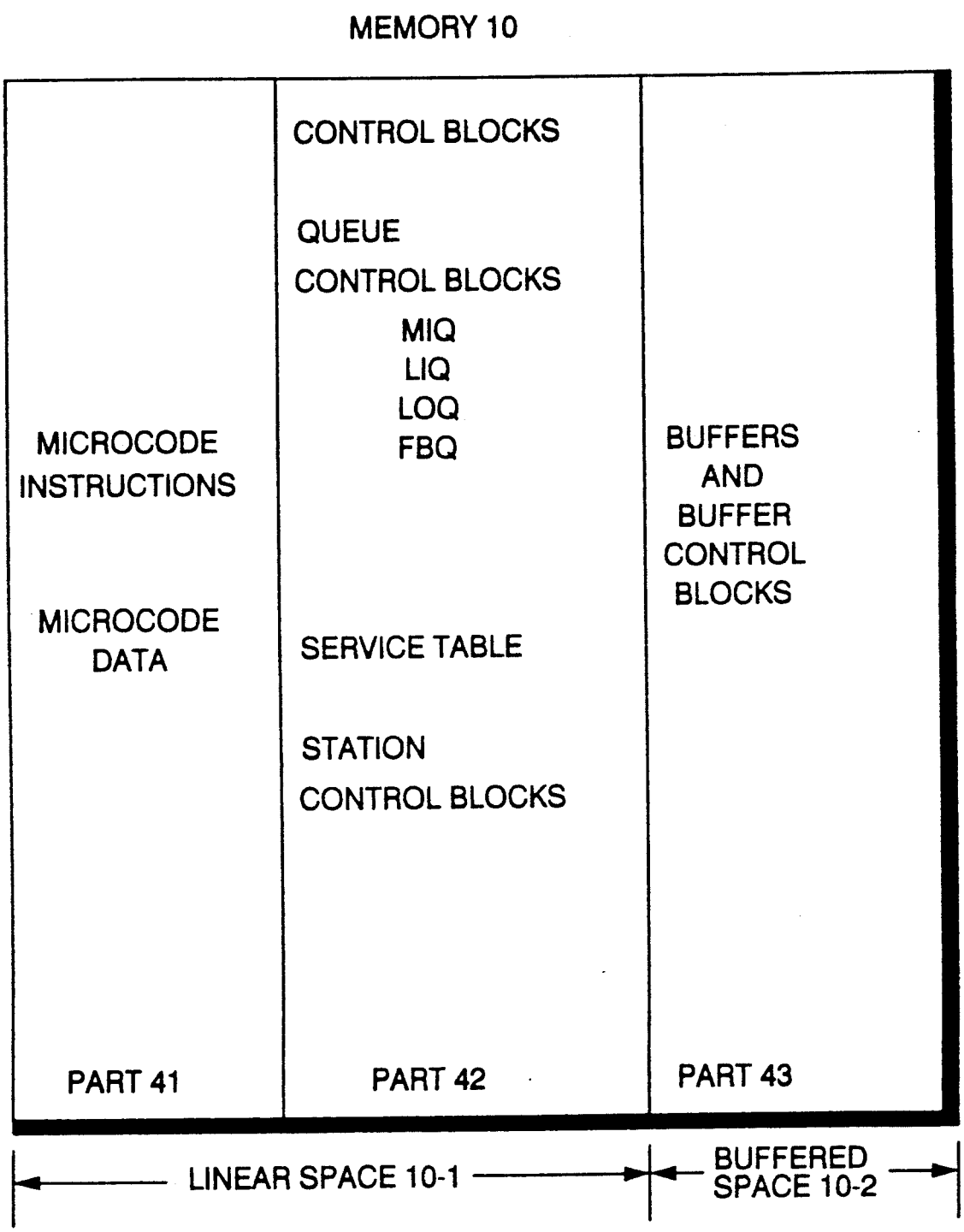
FIG. 2 shows the memory organization.

Box 10 represents the data store memory which is organized as shown in FIG. 2 to give the system the performance and flexibility of the message transfers. The memory is shared by a plurality of users 12 which are connected to communication adapters 14. Adapters 14 perform some physical and data link control layer functions, which means that message bursts are provided to and received from the upper layer. Each adapter may be connected to at least one user. The system allows one user connected to an adapter to transfer messages to another user connected to the same adapter or to another adapter.

At least one specific microprocessor adapter 16 is provided to attach a microprocessor 18 which performs functions such as initialization, error processing, and message routing table set up.

The memory management mechanism 20 according to the present invention, comprises data store interface DSI 22 which controls the message transfers through the shared memory 10, it also comprises memory bus 24, DSI centralized control system DCS 26 and bus access arbiter 28. Interface 30 is provided to attach the microprocessor adapter to the shared memory through mechanism 20.

All data store interfaces DSI, 22 and 30 comprise a mechanism through which devices (communication adapter or microprocessor adapter) interface the shared memory 10. This system is a set of hardware means which perform data movements with the shared memory under request of the attached adapters 16 and 14 without requiring complete message buffering in the adapters.

The functions and structures of each part of mechanism 20 will be described in details later on. It will first, be described how memory 10 is organized to improve the performance of the mechanism.

The data store memory 10 essentially holds two kinds of information organized in two different ways:

The messages received from or to be transmitted to adjacent link stations and control blocks needed for the operation of each adapter. When the data are exchanged using the HDLC protocols the messages are made by the HDLC frames separated by flags. HDLC stands for high level Data Link Control.

Consequently, memory 10 is partitioned as shown in FIG. 2. It is divided into a linear space 10-1 and a buffered space 10-2. Part 41 of linear space 10-1 is dedicated to the storage of microcode instructions and microcode data. Part 42 of linear space 10-1 is dedicated to the storage of control blocks, such as queue control blocks QCB Status Control blocks, service tables.

Buffered space 102 comprises buffers and corresponding buffer control block.

To benefit from the fast paging addressing mode in the dynamic data store implementation, the memory is organized in logical pages containing an integer number of buffers.

The data belonging to a given message are stored in one or several data buffers chained together. The messages are in turn chained together and enqueued into message queues which are thus dynamically built. Each data buffer has a corresponding buffer control block BCB located in a control buffer.

Figure 3:
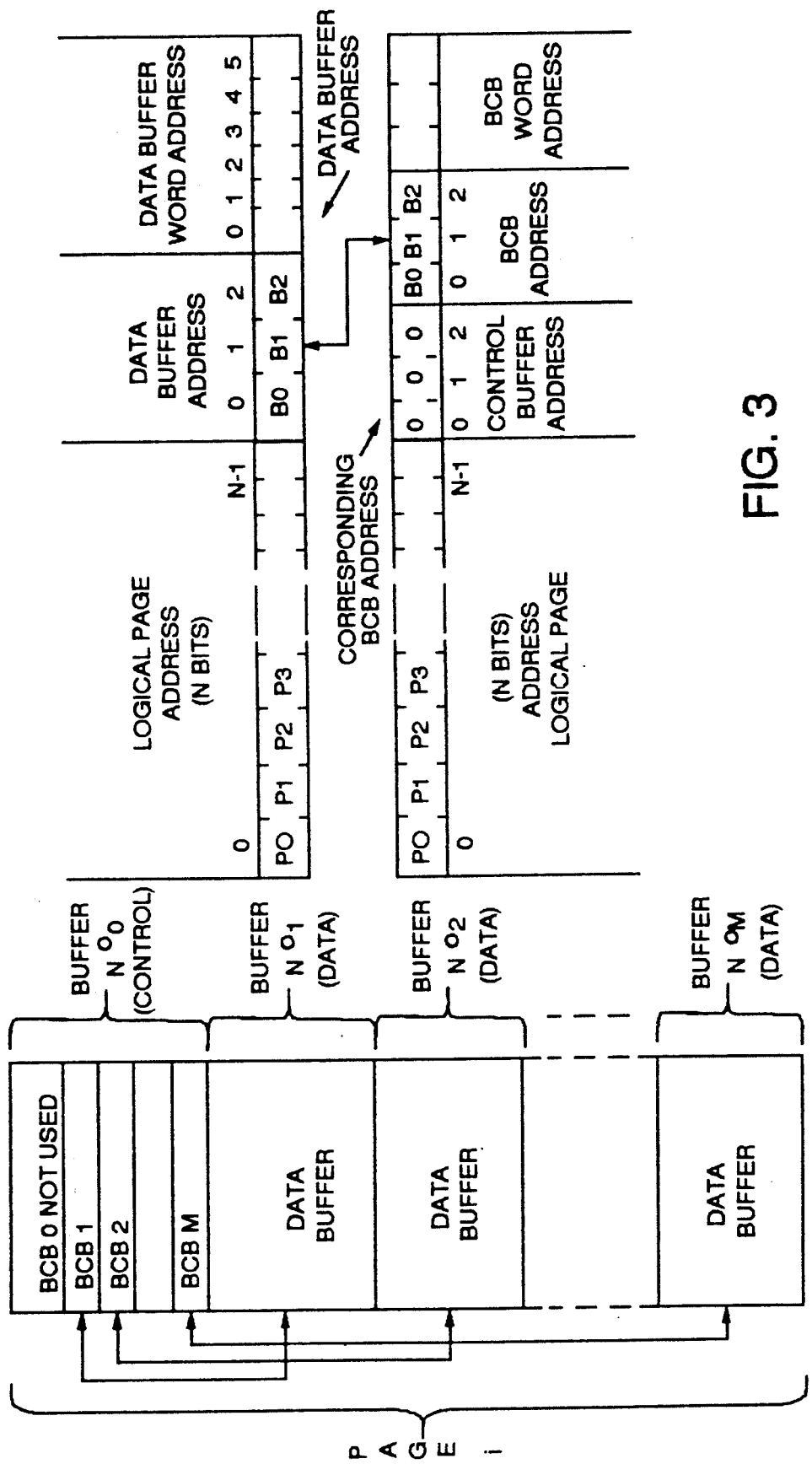
FIG. 3 shows the arrangement of a memory page with the addressing format.

FIG. 3 shows one page i containing m+1 buffers, namely buffer 0 to buffer m. The first buffer, i.e buffer 0 holds buffer control blocks BCB, associated to the other buffers 1 to m.

The size of the logical page is chosen so as to optimize the occupancy of the control buffer 0. It can never exceed the physical page size. To take advantage of the fast paging mode access offered by the dynamic memory implementations, the buffer control block must be stored in the same physical page as its corresponding data buffer. Thus, when data and control information is read or updated consecutively, the access time is drastically reduced. The size of a physical page is a fixed characteristic of the memory.

In a typical implementation of the present invention, one logical page comprises 512 4-byte words, so that a logical page address corresponds to a 512-word boundary. One logical page comprises seven data buffers and one control buffer, each buffer comprising 256 bytes . The control buffer of a given logical page contains the buffer control blocks BCB of the seven data buffers of this logical page. There is a fixed and simple relationship between the address of a data buffer and the address of its corresponding BCB, as shown in FIG. 3.

A data buffer address comprises a logical page address field, containing n-bits: p0 to p (n-1) to address a given page, then a data buffer address field containing three bits b0, b1 and b2 (assuming that the page contains seven data buffer), and then a data buffer word address field.

The corresponding buffer control block BCB address comprises the same logical page address field, then three control buffer address bits which are set to 0, and then the b0, b1 and b2 bits which address the corresponding BCB and then a BCB word address which comprises three bits in the case a BCB comprises eight words. So, the address of a buffer control block may be easily computed from the corresponding data buffer address and vice versa.

In another embodiment of the invention the control buffer containing the m control blocks BCB of m data buffers may be located in a separate first access memory provided that a simple address relationship exists between a data buffer address and its corresponding BCB blocks address.

Figure 4:
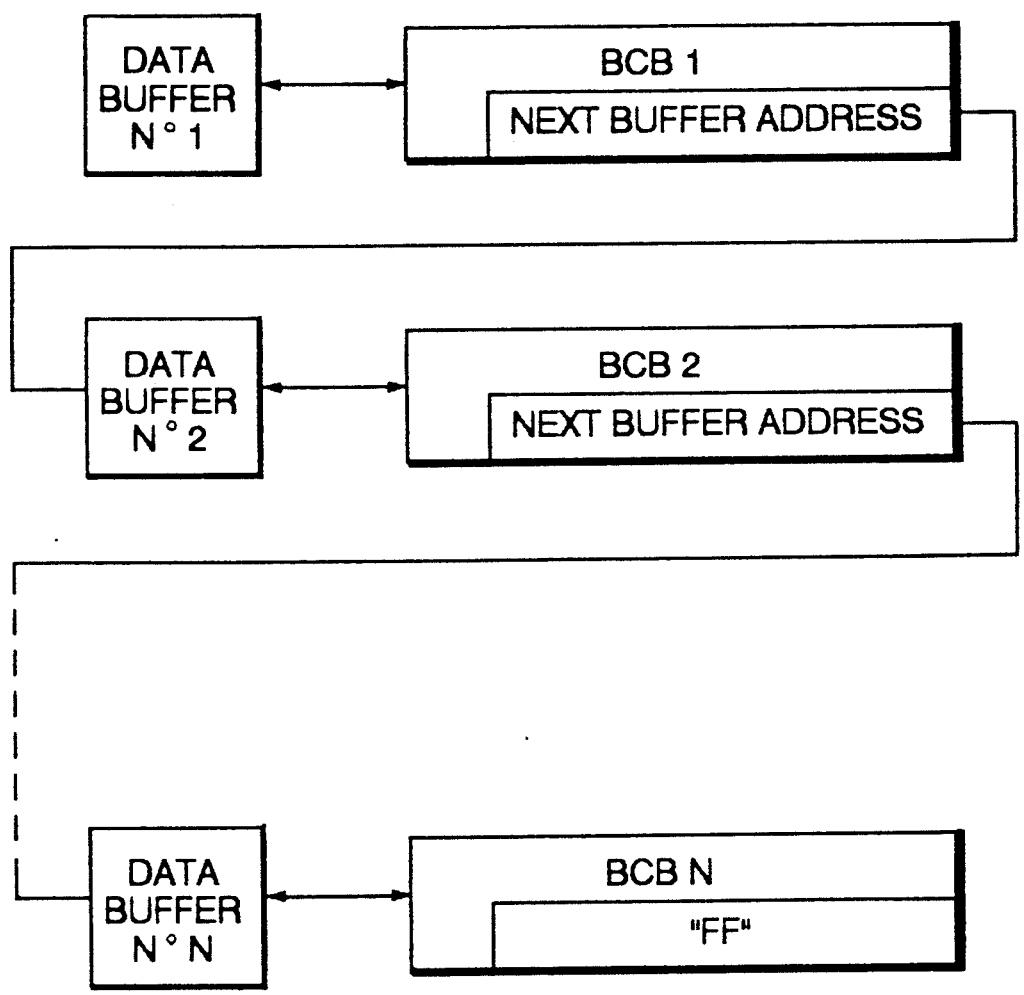
FIG. 4 shows the data buffer chaining.

A variable number of data buffers are chained to be able to store messages of variable length, to build the queues in the buffered space 10-2. The buffer chaining is schematically shown in FIG. 4. A message may be contained in several data buffers. Each buffer control block BCB associated to a data buffer contains the next buffer address. In a typical implementation, the buffer control blocks have a storing capacity of at least two words, their content are shown in FIG. 5. They comprise the message chaining control block MCCB which contains information relating to message chaining within a queue and the buffer chaining control block BCCB which contains information relating to buffer chaining within a message.

The message chaining control block MCCB comprises at least the address of the next message and the message byte count.

The buffer chaining control block BCCB comprises the next buffer address and the buffer byte count. The other fields may be used to control the exchange process, when desired.

Figure 6:
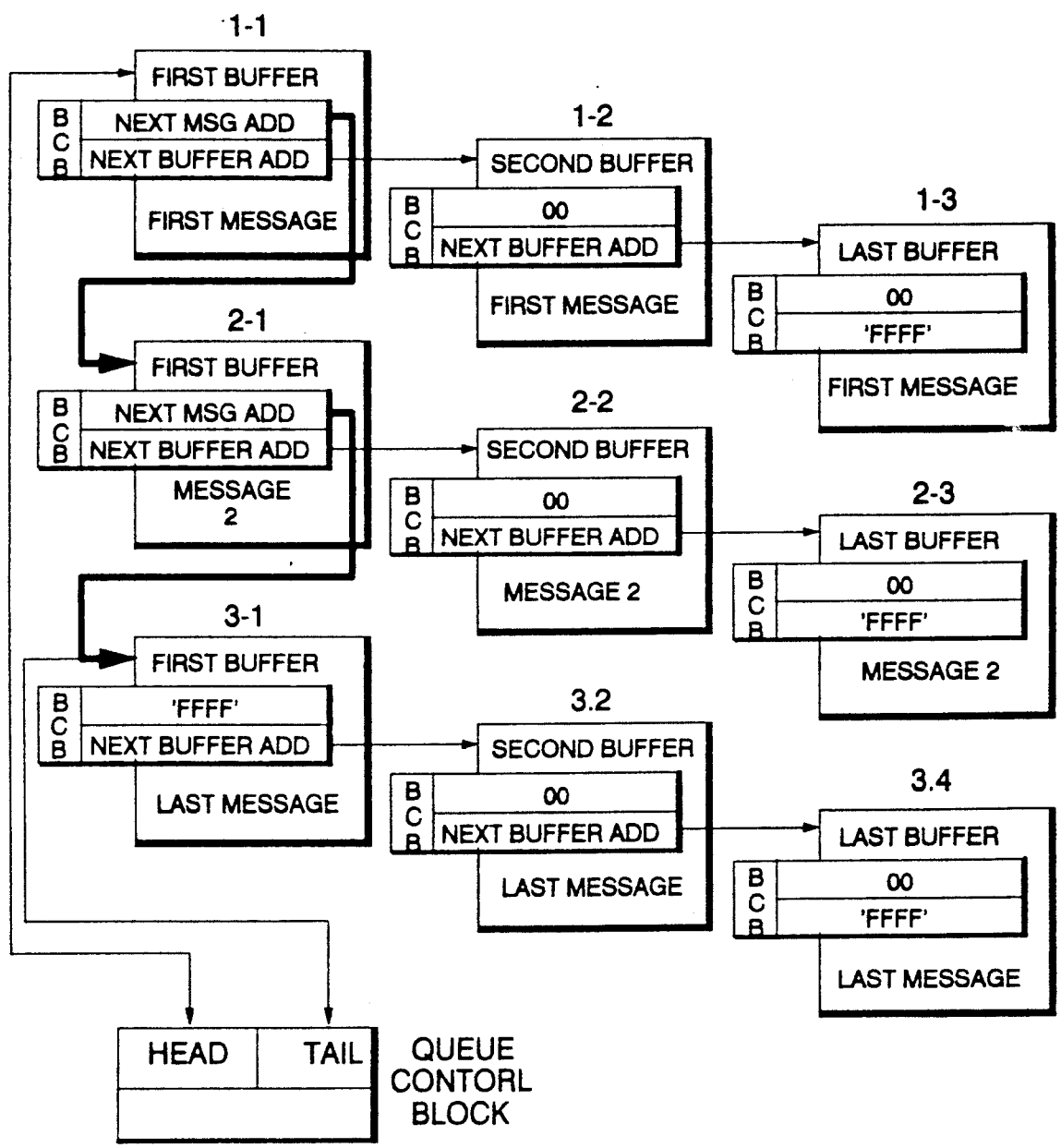
FIG. 6 shows the message chaining.

FIG. 6 shows the chaining mechanism of three messages. The first message is chained in a plurality of buffers, three buffers 1-1 to 1-3 are shown in FIG. 6. The buffer chaining control block of the first buffer of message 1 stores the address of the second buffer of first message and the message chaining control block of first buffer of first message stores the address of first buffer 2-1 of message 2 and the message chaining control block of buffer 2-1 of message 2 stores the address of the first buffer 3-1 of the next message which in that particular case is the last message. The message chaining control block of the first buffer 3-1 of the last message contains the hexadecimal code "FF" in the next message address field which is an indication of the last message.

The message chaining control blocks of the second and third buffers containing the first, second and last messages may contain the hexadecimal code "00" as next message address or any value since this information is of no significance.

The queue control block of the queue containing these messages comprises the address of first buffer 1-1 of the first message in its HEAD field and the address of the first buffer 3-1 of the last message in its TAIL field.

As shown in FIG. 5, the buffer chaining control block BCCB is composed of a first word dealing with buffer chaining and of a second word which may be used to store control data allowing tests to be performed during the exchange, when desired.

The next buffer address field (two bytes) indicates the address of the next buffer within the message. If the present buffer is the last one within the message, this field is set to FFFF. This next buffer address field refers to a 64-word boundary, i.e it is right padded with 000000 to address the first word of next buffer.

The buffer byte count field (one byte) indicates the number of bytes in the buffer, starting from buffer byte 0.

The offset field indicates where the real data portion starts in the buffer. The header portion of the message if any is stored at message address 0 in the buffer.

The message chaining control block MCCB, is shown in FIG. 5. The next message address field, indicates the address of the first data buffer of next message. If the present message is the last one, the next message address field is set to FFFF. The next message address refers to a 64-word boundary, i.e it is right padded with 000000 to address the first word of the next buffer of the next message.

The message byte count field indicates the total number of bytes in the message including the buffer offset value (if any), of the first data buffer. Maximum value of message byte count is 64 kilobytes.

Valid message parameter/status bit V validates the message parameters/status field.

Message parameters/status field holds information relative to the message.

Thus, in buffered space 10-2 of memory 10, various kinds of queues are built in a number of buffers which is variable as a function of the required storing capacity of the queues.

The maximum number of possible queues which depends upon the user number is known and a queue control block is provided in part 42 of linear space 10-1, which is associated to each queue whose buffers are housed in space 10-2. The queue control block stores the address of the queue head (address of the first buffer of the queue) and of the queue tail (address of the last message of the queue) and may also contains additional information as will be described later on.

The free buffer queue FBQ is the queue of all the buffers which are available at a given time, in the memory. The buffers are chained together by means of the buffer control blocks, in the same way as described previously, assuming each message comprises only one buffer. In a preferred embodiment of the invention, the free buffers are chained by the next buffer address in their MCCB blocks.

The free buffer queue which is associated to a free buffer queue control block FBQCB is built at initialization time. The queues are then built by a so-called global order machine which will be described in reference to FIG. 9.

This machine executes the following orders when requested by the users such as the communication adapters or microcode adapter. These orders are the following:

ENQUEUE: this order performs the enqueuing of a message onto a data store queue, DEQUEUE: this order perform the dequeuing of a message from a data store queue and returns to the requester the address of the message LEASE: this order returns at once to a requester the address of a free buffer, previously dequeued from the free buffer queue, DEQ-FREE: this order performs the dequeuing of a buffer from the free buffer queue and returns its address to the requester, RELEASE: this order releases all buffers belonging to a message by enqueueing them onto the free buffer queue, A free buffer is dequeued by a free buffer supplier machine by issuing a DEQ-FREE global order. Its address is then stored in a random access memory able to contain a number of free buffer addresses such as 256 and in such a way that a buffer is available to be given a requester, at once through a LEASE global order.

In a preferred embodiment, the free buffer queue can hold up to 64 kilo free buffers, i.e up to 16 megabytes of buffered data. Free buffer queue management provides two capacity thresholds (limited buffer threshold and critical buffer threshold). In the last case, LEASE global orders are accepted only for the expedited flow.

There are two types of queues which may be built in space 10-2, namely the queues normally handled by the global orders called the message queues, i.e microcode inbound queues MIQ and link outbound queues LOQ, and the link inbound queues LIQ which are built for buffering the incoming messages.

The queues are identified by their queue control block QCBS, composed of four words and located in linear space 10-1. The global orders use a QCB identifier QCB_id to select one of those QCBs. The QCB address is computed as follows:

the QCB_id is right padded with 00 to refer to a 4-word boundary.

a QCB base address set at initialization time and also referring to a 4-word boundary.

Figure 7:
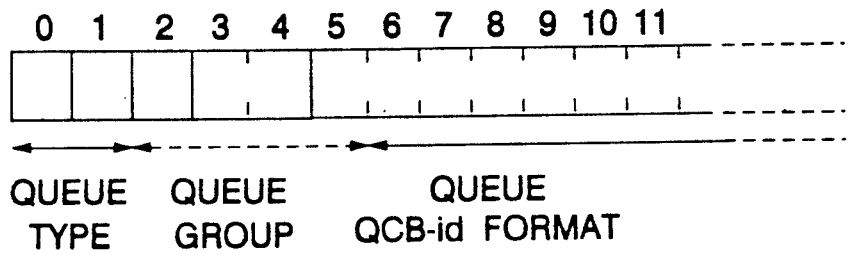
FIG. 7 shows the queue control block fields.

As an example, FIG. 7 shows the QCB_id format and the queue control block formats.

First bits 0 and 1 are indicative of the queue type:
00 indicates one outbound queue an inbound queue group (bit 0=0),
0→one microcode inbound queue,
11→one link inbound queue,
bits 2-5 select one queue group out of 16.

To each of the 16 microcode queue groups corresponds a service table holding one bit per queue in the group, to indicate whether this queue has become active and allowing to interrupt the microprocessor when a first queue in the group has become active.

QCB_id bits 5 to 12 determine one queue out of 128 within a given group.

The QCB_id are assigned to the queue users at initialization.

The format of the message queue control block QCB shown in FIG. 7, is the following:

QUEUE HEAD field: address of the first buffer of the first message in the queue, QUEUE TAIL field: address of the first buffer of the last message in the queue, QUEUE BUFFER COUNT: total number of buffers constituting the message in the queue, QUEUE STATUS: contains various indicators, namely
Queue empty
queue threshold reached
maximum buffer count reached
valid action field BUFFER THRESHOLD: when an ENQ global order is executed, "queue threshold indicator" is set in QUEUE STATUS field and also returned in ENQ return code as long as BUFFER COUNT is greater than BUFFER THRESHOLD, MAXIMUM BUFFER COUNT: when an ENQ is being executed, the new buffer count is compared to MAXIMUM BUFFER COUNT; if this value is exceeded, the ENQ order is rejected, BUFFER COUNT is kept unchanged, "maximum buffer count reached" indicator is set in STATUS field and also returned in ENQ return code, ACTION: contains the station service wake up message to be sent when an outbound queue has become active, ACTION is validated by "valid action field" STATUS indicator.

The format of the free buffer queue control block FQCB shown in FIG. 7, is the following:

QUEUE HEAD: address of the first buffer of the first message in the queue,

QUEUE TAIL: address of the first buffer of the last message in the queue,

QUEUE BUFFER COUNT: total number of buffers in free buffer queue,

QUEUE STATUS: contains various indicators, namely
FBQ (free buffer queue) empty
limited buffer threshold reached
critical buffer threshold reached
valid action field LIMITED BUFFER THRESHOLD: when a DEQ_FREE global order is executed by the free buffer supplier machine, "limited buffer threshold reached" indicator is set in QUEUE STATUS field and also returned in DEQ_FREE return code as long as BUFFER COUNT is lower than (LIMITED BUFFER THRESHOLD), CRITICAL BUFFER THRESHOLD: when a DEQ_FREE global order is executed by free buffer supplier machine, "critical buffer threshold reached" indicator is set in STATUS field and also returned in DEQ_FREE return code as long as BUFFER COUNT is lower than (CRITICAL BUFFER THRESHOLD), ACTION: contains the event to be sent in case of critical situation (in a predetermined queue) ACTION is validated by "valid action field" STATUS indicator.

For each of the 16 inbound queue groups, a service table exists in the data store linear space 1 holding the activity status of each of the 128 queues in the group. The 16 service tables are located in 64 consecutive words (4 per service table) starting at a service table base address which is provided at initialization time and must refer to a 64-word boundary.

The handling of service tables is the following:

when a first ENQ is performed on a given microcode inbound queue of a given group, which means that this queue is not empty, the corresponding bit is set in the service table of this group, when a last message has been dequeued from a given microcode inbound queue of a given group, which means that this queue is empty, the corresponding bit is reset in the service table of this group.

when a first queue in a given group becomes active, i.e. the service table of this group does not contain all zeros any more, a signal is sent to an interrupt controller in order for it to raise an interrupt to the microprocessor and present the interrupt request related to this service table.

Figure 8:
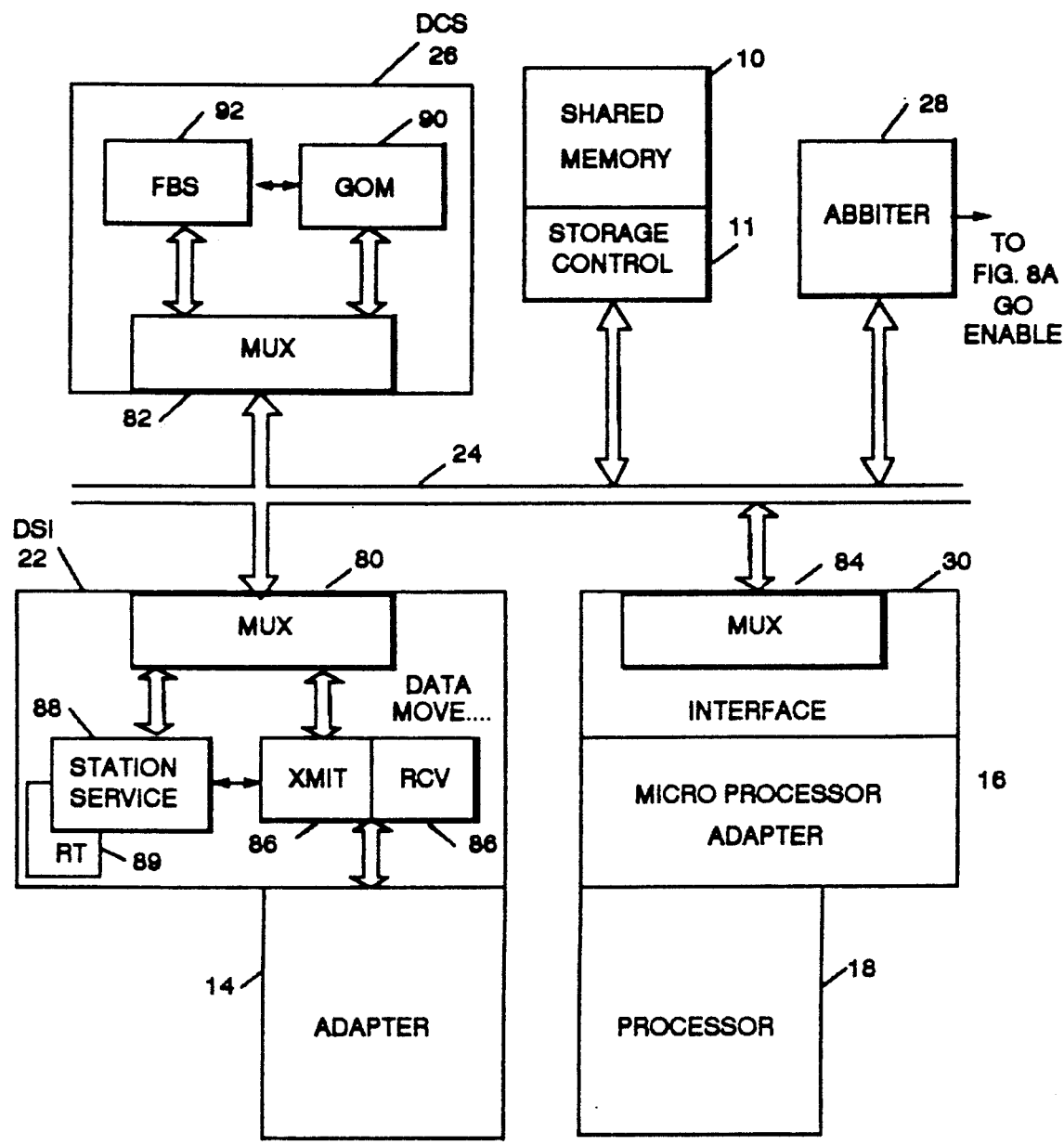
FIG. 8 represents the arrangement of the communication system incorporating the present invention in more details.

FIG. 8 shows the general arrangements for one of the DSI one interface 22, central control DCS 26, and processor interface 30. They are attached to bus 24 through multiplexing circuits 0, 82 and 84, which allows logical entities to be put on the bus or received from the bus by a selected device 22, 26 or 30 under control of arbiter 28. The accesses to shared memory 10 are controlled by conventional storage controller 11.

Interface 22 comprises a data movement control means 86, which performs the chaining of the data messages received by the users attached to adapter 14 and the enqueuing into the link inbound queues (LIQ), and the sending of the data messages dequeued from the link outbound queues (LOQ) to the destination users.

It also comprises a station service means 88 which cooperates with the data movement means 86, and interfaces with the global order machine G.O.M. 90 in central control 26, and a request table 89 which holds information relative to the link inbound and outbound queue status for controlling the data transfers, as will be explained later on in reference to FIG. 26.

Central control system DCS 26, comprises global order machine 90 which receives from bus 24, global orders from requesting interfaces 22 or 30, processes these orders and generates responses to be sent to the global order requesting interface. The processes which are implemented for each global order will be detailed later on. It also comprises a free buffer supplier machine FBS 92, which issues DEQ_FREE global order to the global order machine GOM 90 through multiplex 82 and bus 24. The address of a free buffer which is dequeued from the free buffer queue is stored in a random access memory called leased buffer pool, able to contain a plurality of such leased buffer addresses. One address can be given to any requester through a LEASE global order. Thus, the free buffers are fed very quickly to the requesters, avoiding overrun conditions.

Global order machine 90 provides services for the following requesters with the following priority rank:
 1—free buffer supplier
 2—adapter interface (data movement receive/station services)
 3—microprocessor each having an identification code. For example, 000 for microprocessor, 100 for station service and 010 for free buffer supplier 92. Since, each DSI 22 comprises a station service, a hard wired identification is added to the identification code 100 of the each station service.

In order to have its global order request transmitted to global order machine, a requester raises a Global Order Request to arbiter 28. If no other higher priority bus request is pending, arbiter 28 sends a global order grant signal to the requester and to global order machine 90 (GO ENABLE signal).

The general format of the global order requests sent by a requester and of the global order responses sent by the global order machine 90 to the requester is described below.

Global Order Request/Response general format GO stands for global order. The format is shown in FIG. 9.
 Address byte 1:
 bit 0: set to 1 memory access mode
 bit 1: set to 1 (Global Order)
 bits 2-3-4: Global Order Request/Response Destination identifier DST
 bits 5-6-7: Global Order Request/Response Origin identifier ORG
 The Origin/Destination field identifies one of the following parts:
 000 Processor
 001 GOM 90
 010 FBS 92
 100 Adapter interface
 Address byte 2:
 Bits 0-3 specify the Global Order type
 0000 ENQ
 0010 DEQ
 0011 LEASE
 0100 DEQ-FREE
 0101 REL
 Other fields
 They are dependant on Global Order type as described below.

An ENQ global order request contains the address of the message MSG_ADD (i.e. the address of the first buffer of the message) to be enqueued in the GO dependent data bytes 2 and 3 and the queue identification of the queue: QCB-id to which it has to be enqueued in GO dependent address bytes 2 and 3.

The ENQ response contains a return code indicative of the queue status in data bytes 0 and 1. The return codes are the following:
 queue empty
 queue threshold reached
 request rejected A DEQ (dequeue) global order request contains the identification of the queue QCB_id from which a message has to be dequeued in GO dependent address bytes 2 and 3.

The DEQ response contains a return code in data bytes 0 and 1 and the address of the message: MSG_ADD which has been dequeued.

The returns codes are the following:
 queue empty
 queue threshold reached
 request rejected A LEASE global order is particular, as it does not imply global order machine 90 but free buffer supplier 92.

It consists in a read operation of the free buffer supplier register which holds the address of a leased buffer ready to be given to the requester.

This read operation can be issued as soon as any bus grant is provided by arbiter 28 to any requester.

GO dependent address byte 3 contains a called expedite flow bit in order to get a buffer address even if free buffer queue has reached its critical buffer threshold.

The returned data consists in a return code and the address of the leased buffer given by free buffer supplier 92.

The return code contents are:
 limited buffer threshold reached
 request rejected
 leased buffer pool empty A DEQ_FREE (dequeue free) global order is used by free buffer supplier to fill the leased buffer pool.

The DEQ_FREE request only contains the DEQ_FREE global order type and the DEQ_FREE response contains a return code and the address of the buffer which has been dequeued from the free buffer queue.

The return code contents are the following:
 limited buffer threshold reached
 critical buffer threshold reached
 request rejected A REL (release) global order request contains the address of the message MSG_ADD in data bytes 2 and 3.

The response contains a return code in data bytes 0 and 1.

The return code contents are the following:
limited buffer threshold reached
critical buffer threshold reached
request rejected Global order machine 90, FIG. 8A, comprises input-/output and working registers 100 for storing the address and data bytes which are received from or to be sent on bus 24 according to the request and response formats of the global orders, which were described above. They are also used for saving the information as required, during the execution of the global orders.

Logic 102 is the control interface between register 100 and finite state machine 104 which executes the logic processes implementing the global orders.

The processes implemented by global order machine 90 will now be described.

As far as, arbiter 28 answers to a global order request from a user by a global order bus grant which is the GO enable signal on line 106, the global order request is sent on bus 24. The GO request is kept active by the requesting user until it has got the global order response from machine 90.

As GO bus grant may be dropped at any time by bus arbiter 28 while a global order is being executed, global order machine checks that GO enable line 106 is active each time it has to access data store bus 24. If GO enable is inactive, the bus access is delayed until GO enable is active.

Figure 10A:
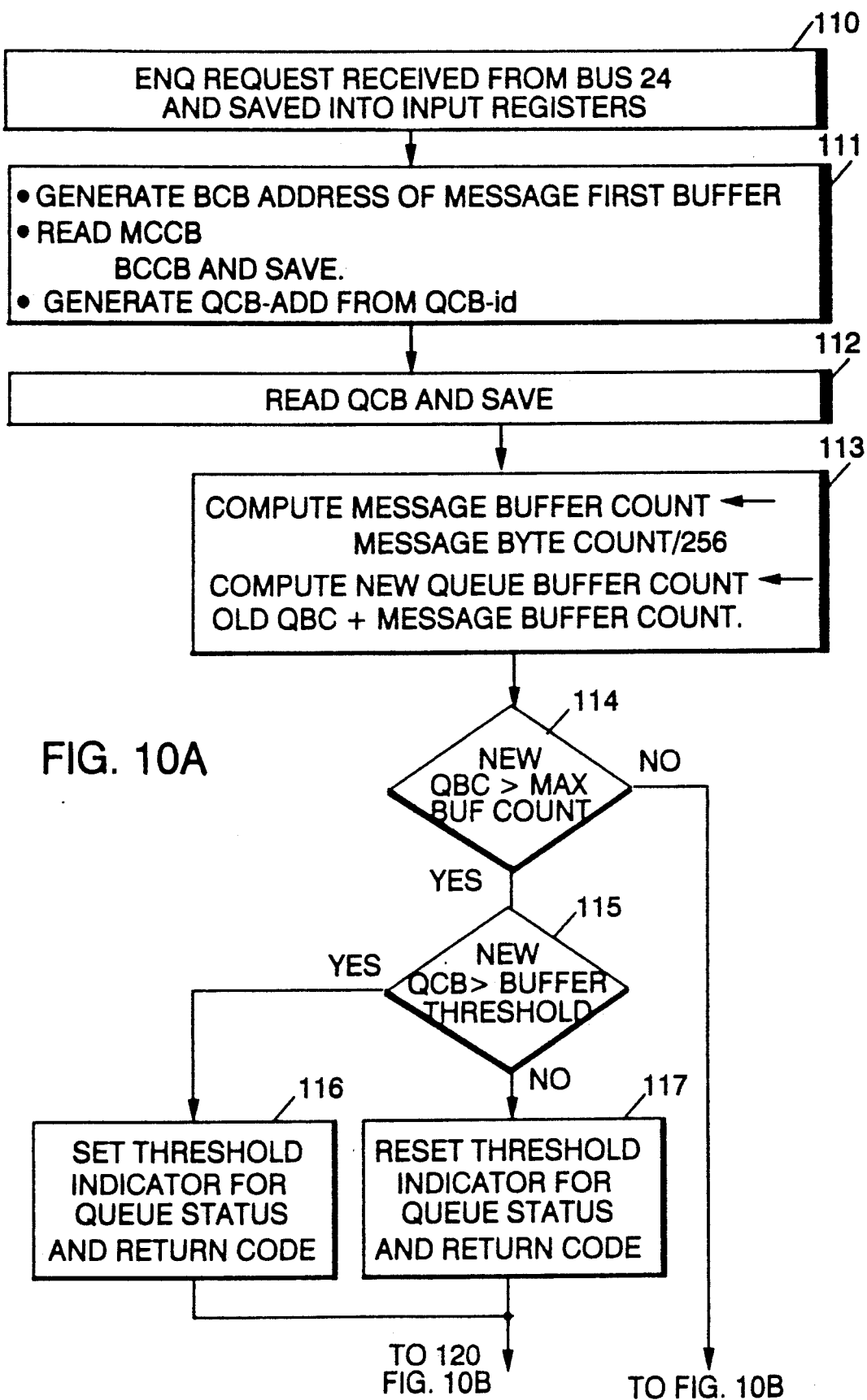
FIGS. 10A and 10B show the functions which are performed by logic 102 and 104 of global order machine for processing an enqueue global order.
Figure 10B:
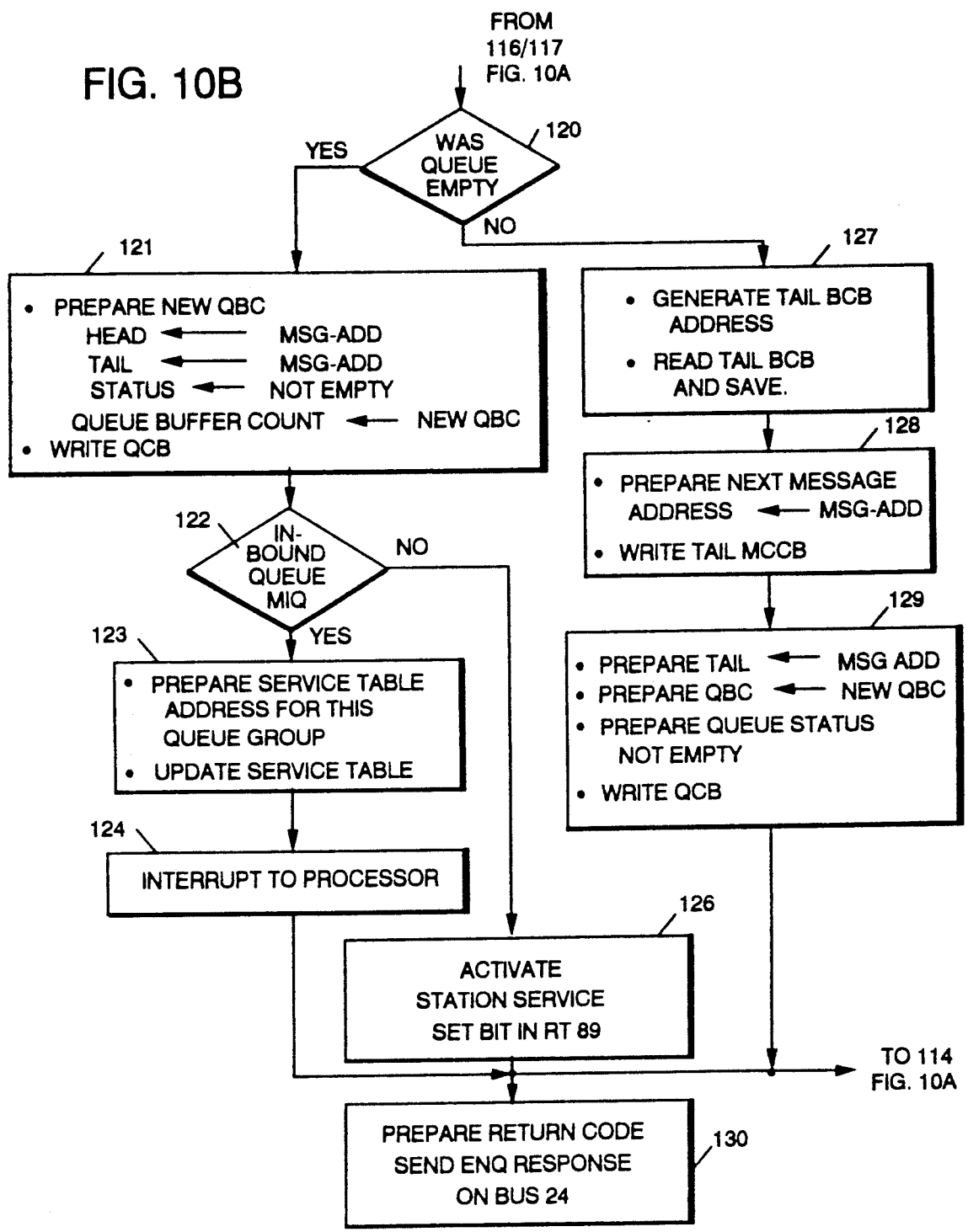

The flowchart of the enqueue operation is shown in Figures 10A and 10B.

First, (step 110) the ENQ request received from bus 24 and inputted into registers 100 is decoded by control logic 102 to initiate the enqueue process in finite state machine 104. The enqueue request is saved in registers 100.

The second operation (step 111) consists of computing the address of the message buffer control block (BCB) from the message address which contains the address of the first buffer of the message to be enqueued, as explained in reference to FIG. 3.

The two words MCCB and BCCB of this BCB block are read and saved. These words contain the message byte count to be used in a further operation.

Also the address of the queue QCB_ADD is generated from the identification QCB_id of the queue to which the message is to be enqueued.

Then, (step 112), the QCB block is read and saved, it contains the buffer count of the queue to which the new message is to be enqueued.

In step 113, the buffer count QBC of the message to be enqueued is computed it is equal to the buffer count from the MCCB divided by the buffer content, (i.e. 256 bytes in the preferred embodiment) . This number is added to the queue buffer count read from the QCB to obtain the new buffer count.

In step 114, this count is compared to the maximum buffer count.

If it is found lower, it is compared (step 115) with the buffer threshold.

If it is found higher than the buffer threshold, the threshold indicator is set in the STATUS field of the QCB and the return code is prepared (step 116).

If not, the threshold indicator is reset in the STATUS field of the QCB and the return code is prepared ( step 117) .

Steps 110 to 117 shown in FIG. 10-A are performed to fetch and check the control blocks.

Then, the enqueuing process is performed, as shown in FIG. 10-B.

First, finite state machine 104 determines from the QCB STATUS field saved from step 112 whether the queue was empty or not (step 120).

If it is empty, the new QCB of this queue is prepared, to be written into the memory at the QCB address (step 121).

The message address MSG_ADD is to be written in the HEAD and TAIL fields, the STATUS field is to be written with the information queue not empty, and the queue buffer count is to be written with the new buffer count QBC calculated during step 113.

In step 122, the QCB_id is tested to determine whether the enqueueing process is performed on a microcode inbound queue.

If yes, the address of the service table is prepared and the service table is updated (step 123).

Figure 11A:
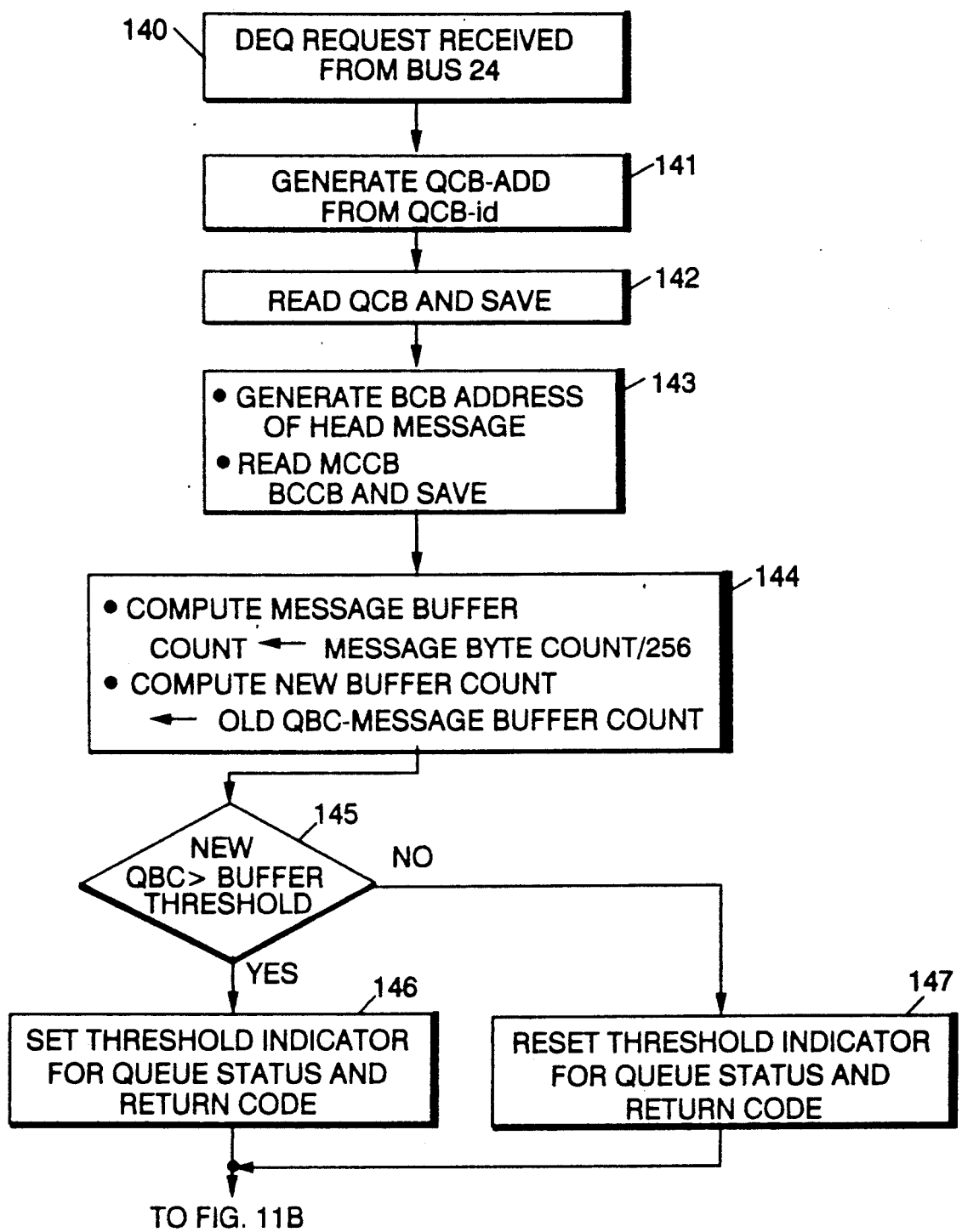
FIGS. 11A and 11B show the functions which are performed by logic 102 and 104 for processing a dequeue global order.
Figure 11B:
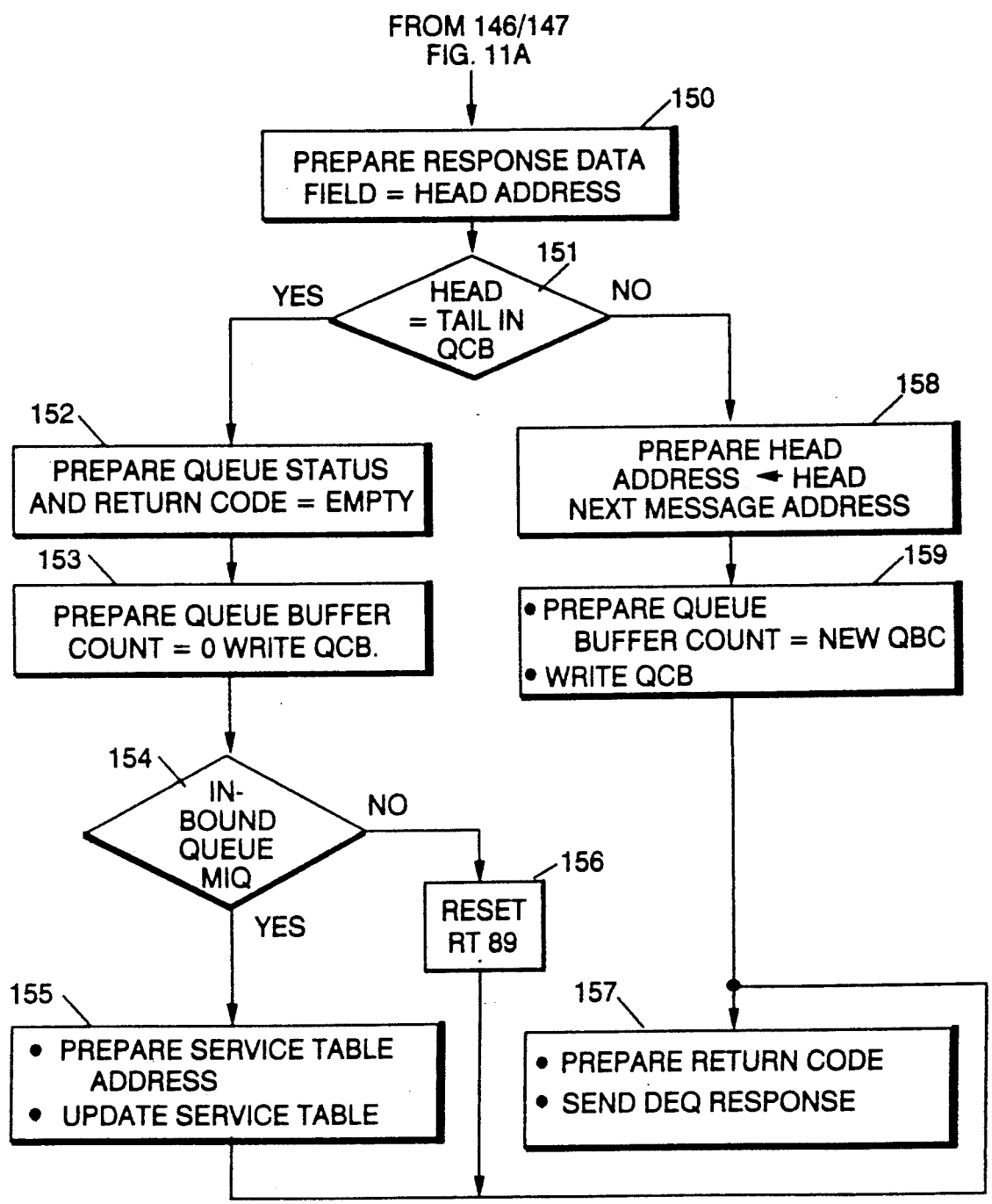

An interrupt is raised to microprocessor (step 124) to signal that a microcode inbound queue is not empty. Thus, the microprocessor may initiate a dequeueing process to get the message enqueued in this queue, process the message (routing, path control) and enqueue the message onto the destination outbound queue. This operation is only required when the messages have to be processed by the microcode. In that case, the microprocessor gets the messages by sending a dequeue global order to machine 90 which is handled as will be described in reference to FIGS. 11A and 11B. The microprocessor may process the messages (routing flow control) and then enqueue them on the link outbound queue by sending an enqueue global order. The messages are then sent to the destinations user from the link outbound queue.

Then, the return code is prepared and the enqueue response is sent on bus 24.

If the queue is not a microcode inbound queue, the station service means 88 of the adapter interface is activated (step 126), which is thus aware that a link outbound queue for a user connected to the adapter contains messages to be transmitted or a link inbound queue is read to be processed as will be described in reference to FIG. 26.

If it is detected that the queue is not empty (step 120), the address of the buffer control block of the tail of the message queue is generated from the tail field of the queue control block.

The buffer control block is read and its content is saved (step 127).

The next message address to be written into the buffer control block (MCCB) which is equal to the message address is prepared and written into MCCB (step 128).

The new queue control block is prepared (step 129).

Tail field is equal to message address, QBC is equal to the new QBC calculated at step 113, the queue status is: "not empty". The new queue control block is written.

During the last step of the enqueue process (step 130) which follows steps 124, 126, 129 or step 114, the return code is prepared and the ENQ response is sent on bus 24 through output registers 100.

It will now be described in reference to FIGS. 11-A and 11-B the operations which are performed by global order machine 90 to implement a dequeueing process.

The DEQ request is received from the bus 24. This request contains the QCB_id identification of the queue from which the messages have to be dequeued.

The request address and data fields are saved in one input register 100 (step 140). The QCB address is generated from QCB_id (step 141).

The QCB block is read (step 142) and its content is saved in registers 100. This block contains the address of the first buffer of the queue.

The address of the BCB block of this first buffer is generated and the BCB block is read. The MCCB and BCCB information are saved (step 143).

The message buffer count is computed (step 144). It is equal to the message byte count read from MCCB divided by the buffer byte count which is equal to 256 in a preferred embodiment.

The new buffer count is computed if it is equal to the old QBC contained in the queue control block minus the message buffer count.

The new queue buffer count is compared to the buffer threshold (step 145) if it is found higher than this threshold (step 146), the threshold indicator for queue status is set and the return code is prepared.

If it is found lower than the threshold (step 147), the threshold indicator is reset and the return code is prepared.

Then, the dequeueing is performed (FIG. 11-B).

The response data field is prepared (step 150), the message address to be returned is the, address of the first buffer of the queue contained in the head field of the queue control block.

The HEAD field of QCB is compared to the TAIL field.

If they are found equal, which means that the queue will be empty, the queue status and return code equal to "queue empty" is prepared (step 152).

The new queue buffer count=0 is written into the queue control block (step 153).

Then, in step 154, the QCB_id saved in step 140 is checked to determine whether the queue is a microcode inbound queue.

If yes, the service table address is prepared for this queue group and the service table is updated (step 156).

If no, the status bit in request table 89 are reset (step 156). Then, after step 155 or 156, the return code is prepared and the dequeue response is sent on bus 24 through an output registers 100 (step 157).

The originator of the request receives the address of the message which has been dequeued and may process the messages.

If it is determined at step 151, that the HEAD address is different from the TAIL address in the queue control block, the HEAD address of the queue control block equal to the next message address saved at step 143 is prepared (step 158) to be written into the queue control block together with the new queue control block (step 159).

Then, the DEQ response is sent on bus 24 (step 157).

Figure 12A:
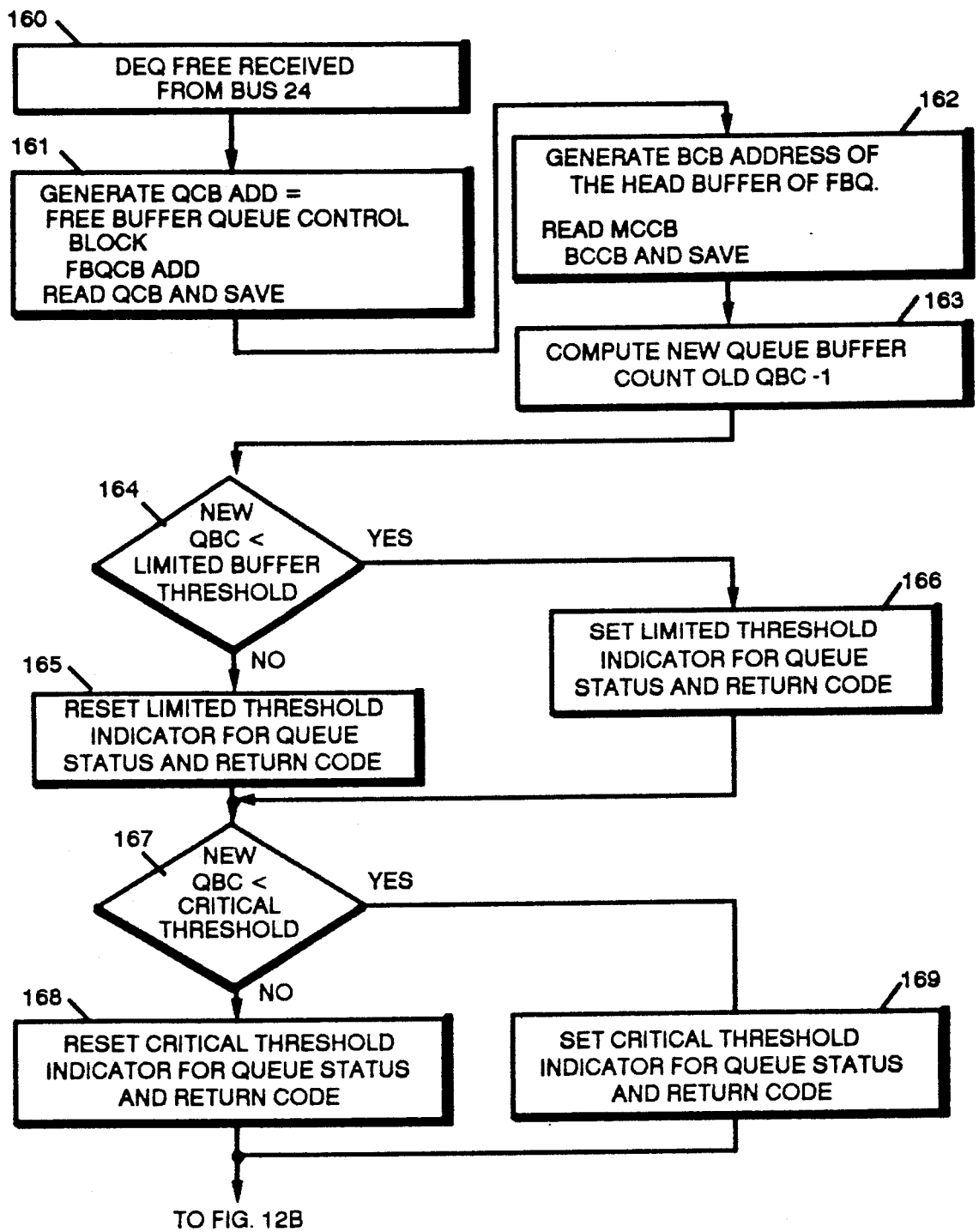
FIGS. 12A and 12B show the functions which are performed by logic 102 and 104 for processing a dequeue free global order.
Figure 12B:
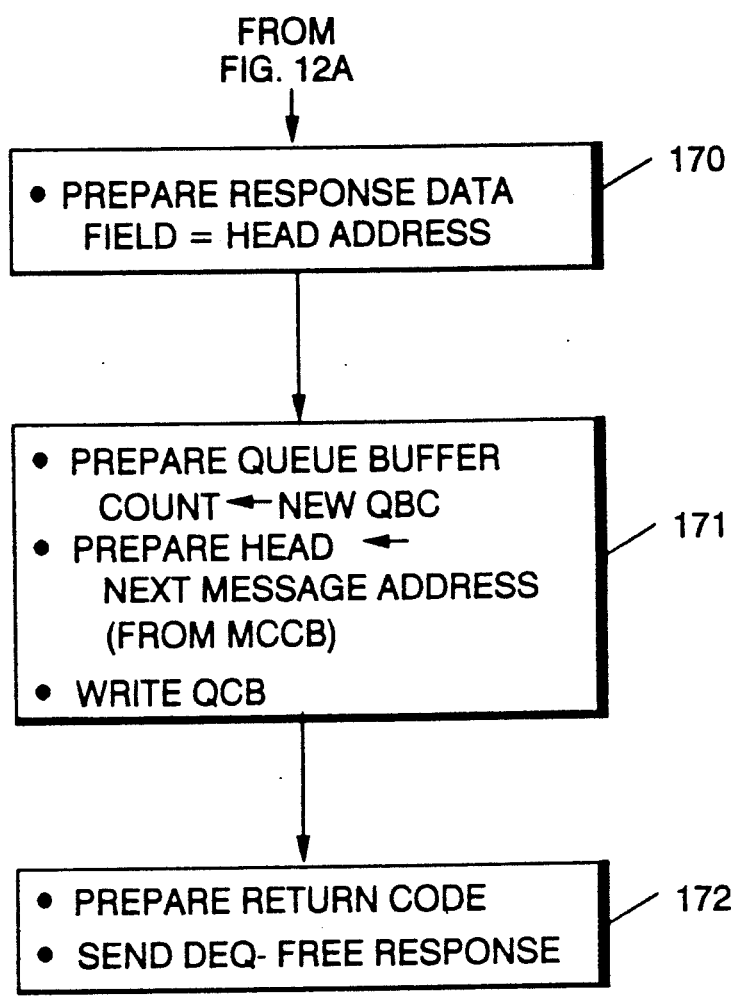

The process performed for dequeueing a buffer from the free buffer queue is described in FIGS. 12-A and 12-B. The DEQ FREE originator of the global order is the free buffer supplier machine 92.

The DEQ_FREE order is received by the global order machine from bus 24 (step 160).

Then, the address of the free buffer queue control block is the free buffer queue control block address. The QCB is read and saved (step 161).

The address of the buffer control block of the first buffer is generated from the HEAD field of the QCB. The BCB is read and the MCCB and BCCB are saved (step 162).

The new queue buffer count which is equal to the old queue buffer count in QCB minus 1, is computed (step 163).

The new QBC is compared to the limited buffer threshold set in QCB and saved at step 161, step 164.

If it is lower, the limited threshold indicator for queue status and return code is reset (step 165).

If it is higher, the limited threshold indicator for queue status and return code is set (step 166).

The new QBC is compared to the critical threshold (step 167). If it is lower than this threshold, the critical threshold indicator for queue status and the return code are reset (step 168). If it is higher, the critical threshold indicator for queue status and return code is set (step 169).

Then the dequeueing process takes place, as shown in FIG. 12-B.

The response data field is prepared (step 170) it is equal to the HEAD field saved at step 161.

The queue buffer count which is equal to the new QBC is prepared, the new HEAD field of the QBC equal to the next message address saved at step 162 is prepared and the QCB is written (step 171).

The return code is prepared and the DEQ_FREE response is sent on bus 24 (step 172).

Thus, the free buffer machine 92 gets the address of a free buffer which is added to the leased buffer pool, as will be explained later on.

It will now be described in reference to FIGS. 13-A, 3-B and 13-C, the release process which allows buffers to be enqueued to the free buffer queue when their messages contents have been successfully transmitted to the destination users.

In the free buffer queue, the buffers are chained together, by the next message address contained in the MCCB, and the messages are considered as contained in only one buffer, so that the next buffer address in the BCCB is always equal to FFFF.

Figure 13A:
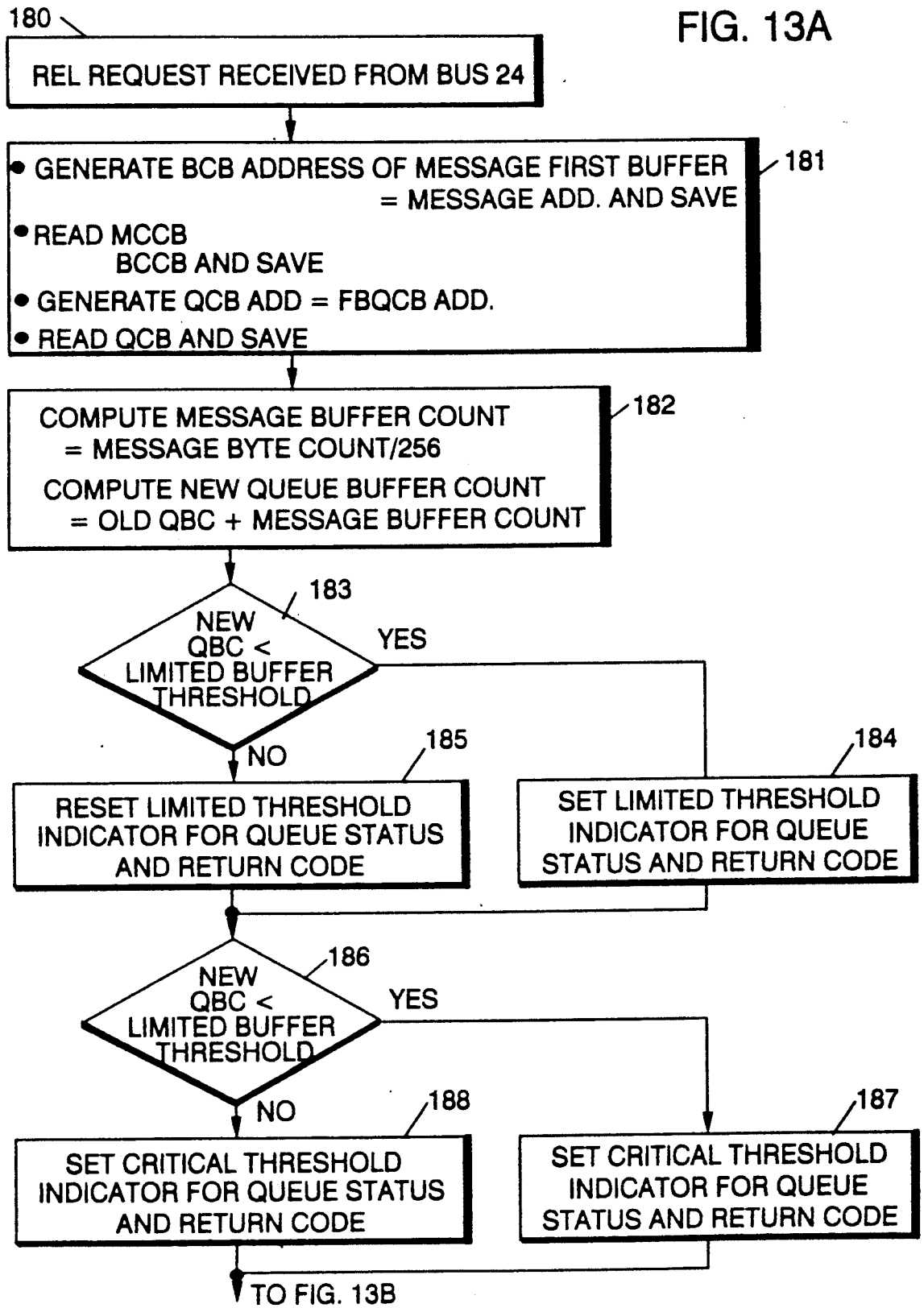
FIGS. 13A to 13C show the functions which are performed by logic 102 and 104 for processing a release global order.
Figure 13B:
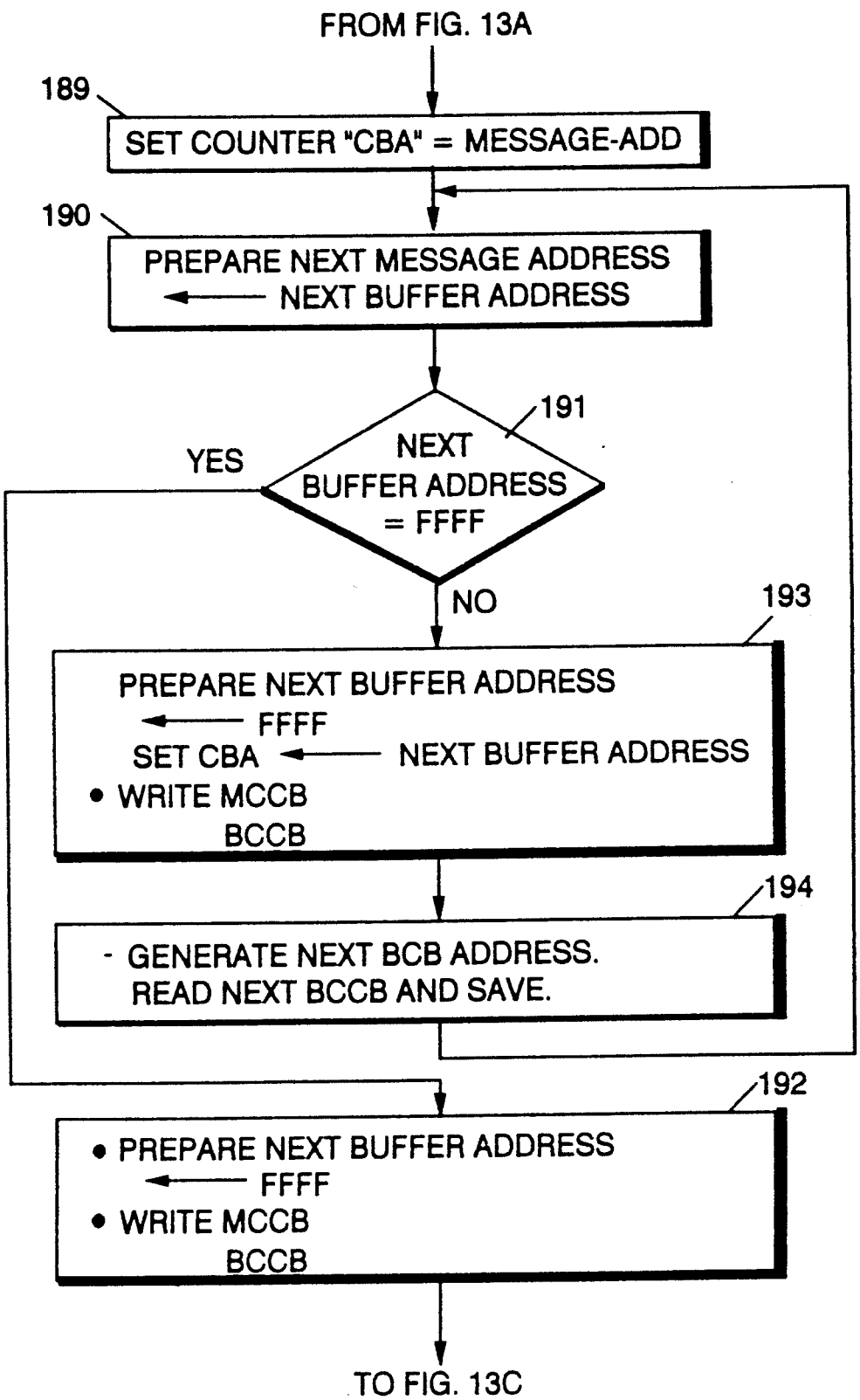
Figure 13C:
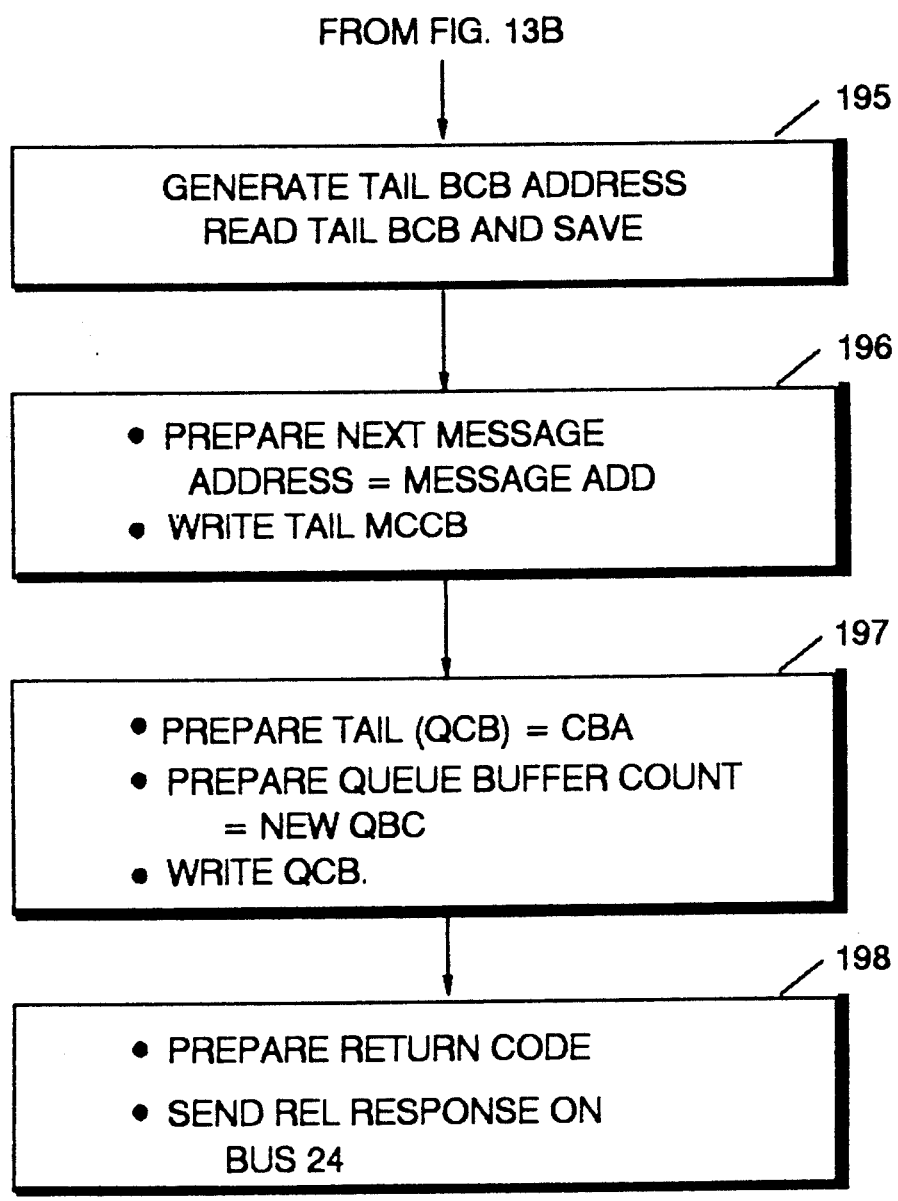

The first operations shown in FIG. 13-A prepare the releasing process.

The RELEASE request is received from bus 24, step 180.

It contains the address of the message to be released.

The message may be contained in only One buffer or several buffers chained together.

The buffer control block BCB address of the first buffer of the message is generated from the message address. The MCCB and BCCB information is read. The queue control block address QCB_ADD is generated, it is equal to the free buffer queue address. The QCB content is read and saved (step 181).

The new queue buffer count, new QBC, is computed, it is equal to the old buffer count contained in the QCB block saved at step 181 +the message buffer count. The message buffer count is equal to the message byte count contained in MCCB saved at step 181 (step 182).

The new QBC is compared with the limited buffer threshold contained in QBC saved at step 181 (step 183).

If it is found lower, the limited threshold indicator for queue status and return code is set (step 184).

If it is found higher, the limited threshold indicator for queue status and return code is reset (step 185).

The new QBC is also compared to the critical buffer threshold (step 186). If it is found lower, the critical threshold indicator for queue status and return code is set (step 187). If it is found higher, the critical threshold indicator for queue status and return code is reset (step 188).

Then, the message buffers are checked and marked as shown in FIG. 13-B.

A counter "current buffer address" CBA is set to the message address initial value, step 189.

The next message address equal to next buffer address saved from BCCB at step 181 is prepared (step 190).

The next buffer address is tested (step 191).

If it is found equal to FFFF meaning that the buffer is the last message buffer, the next buffer address equal to FFFF is prepared and the MCCB and BCCB equal to FFFF are written (step 192).

If not, next buffer address equal to FFFF is prepared, CBA counter is set to next buffer address prepared at step 190. MCCB is written with CBA value and BCCB is written with FFFF (step 193).

The next BCB address is generated, and next BCCB is read and saved (step 194). Then, step 190 is entered, and the process is implemented until it is found that next buffer address is FFFF, which means that the control blocks of the message buffers have been updated. Then the queueing process is performed as shown in FIG. 13-C.

The address of the BCB of the last buffer of the free buffer queue is generated, from TAIL field of the free queue control block. The block content is read and saved (step 195).

Next message address to be written into MCCB which is equal to message address saved at step 181 is written in MCCB block of the last message buffer of the free buffer queue (before release) (step 196).

TAIL field of QCB equal to CBA counter value and the queue buffer count computed at step 182 are prepared and the QCB block is written (step 197).

Finally, the return code is prepared and the RELEASE response is sent on bus 24.

Figure 14:
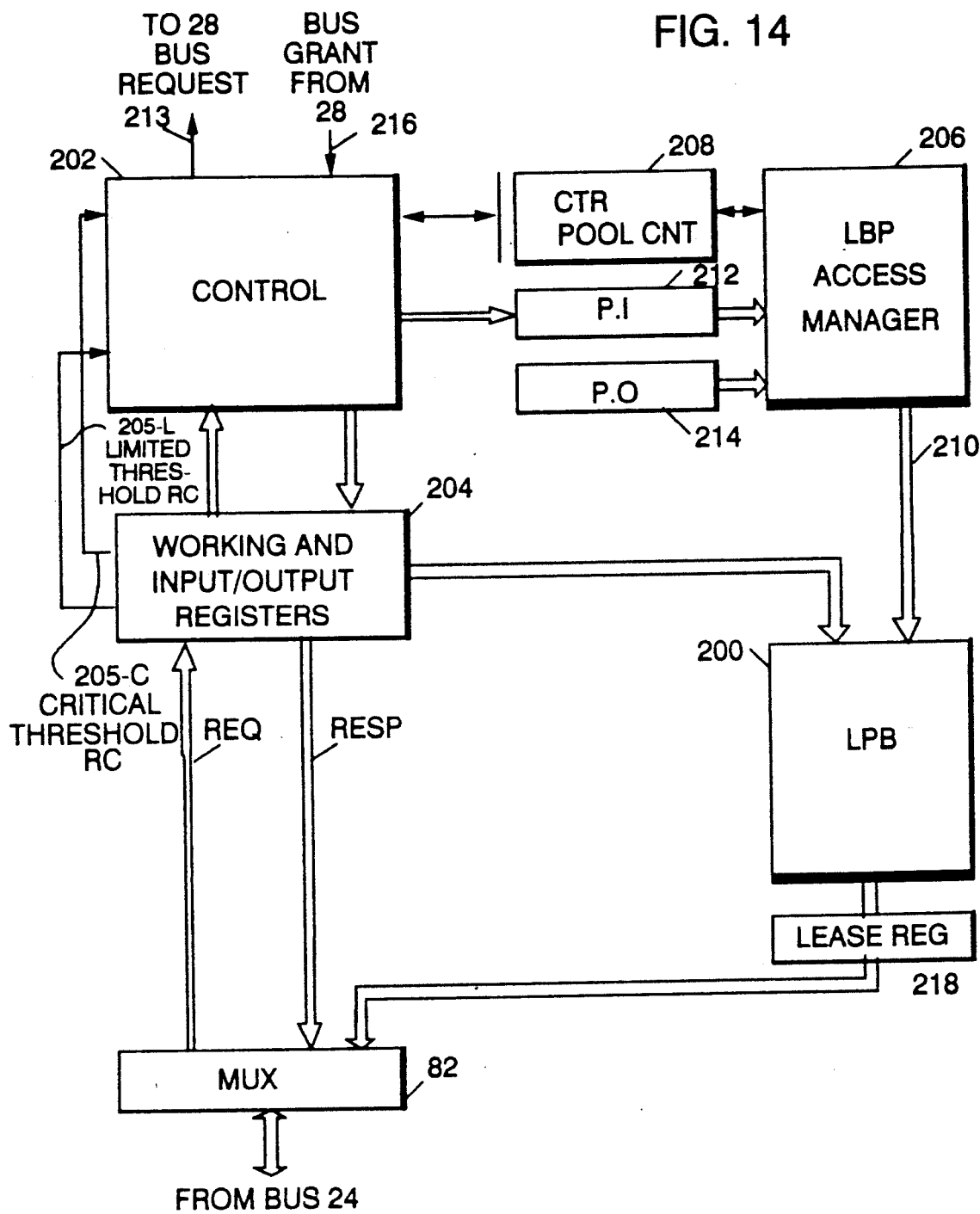
FIG. 14 represents the free buffer supplier machine 92.

Free buffer supplier machine 92 will now be described in reference to FIG. 14.

It comprises a leased buffer pool LBP 200, which is a random access memory into which the addresses of free buffers received by free buffer supplier machine 92, in the DEQ_FREE global order responses, are written.

Figure 15A:
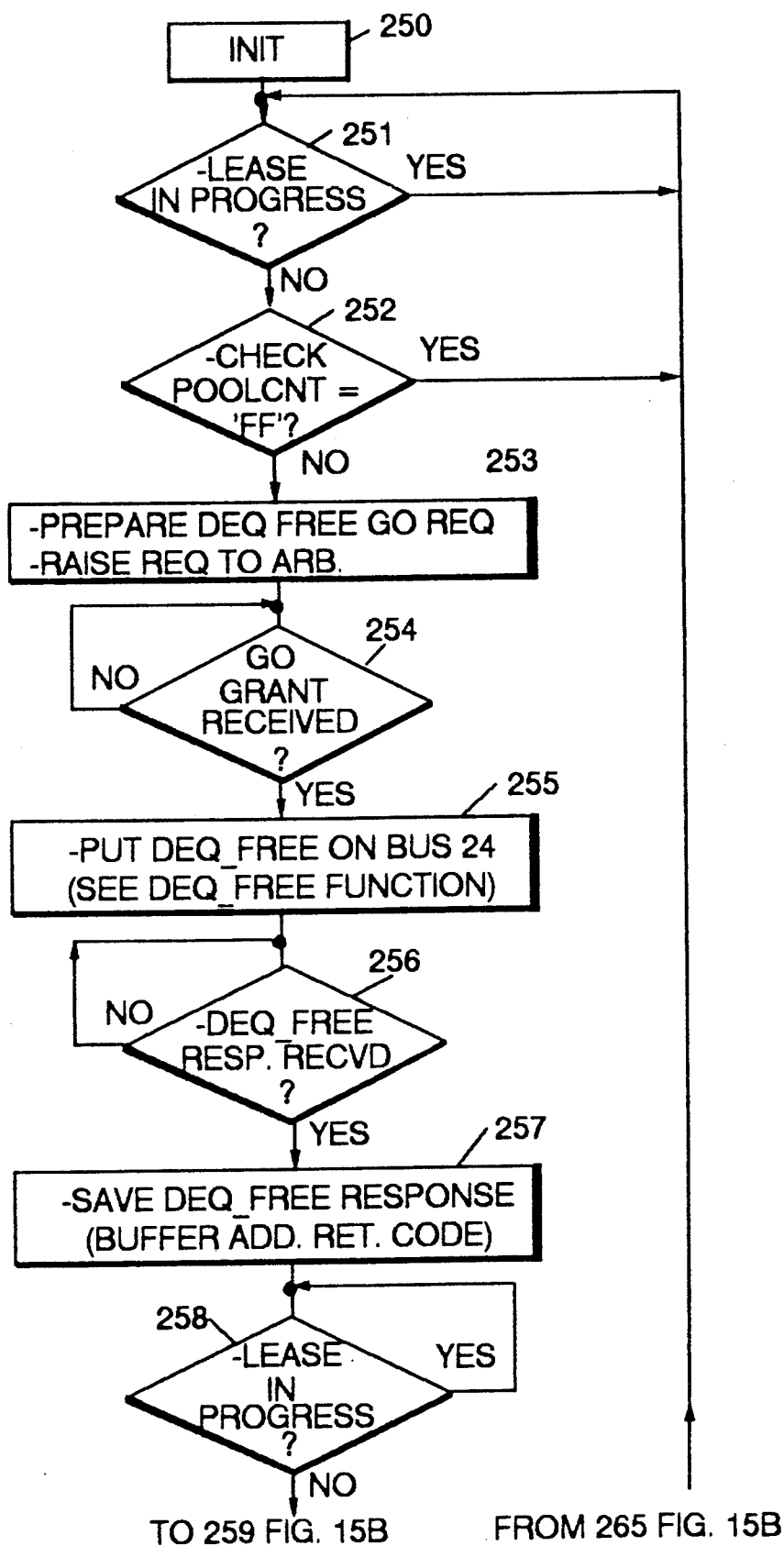
FIGS. 15A and 15B represent the functions performed by logic 206 for loading the free buffer pool 200.
Figure 15B:
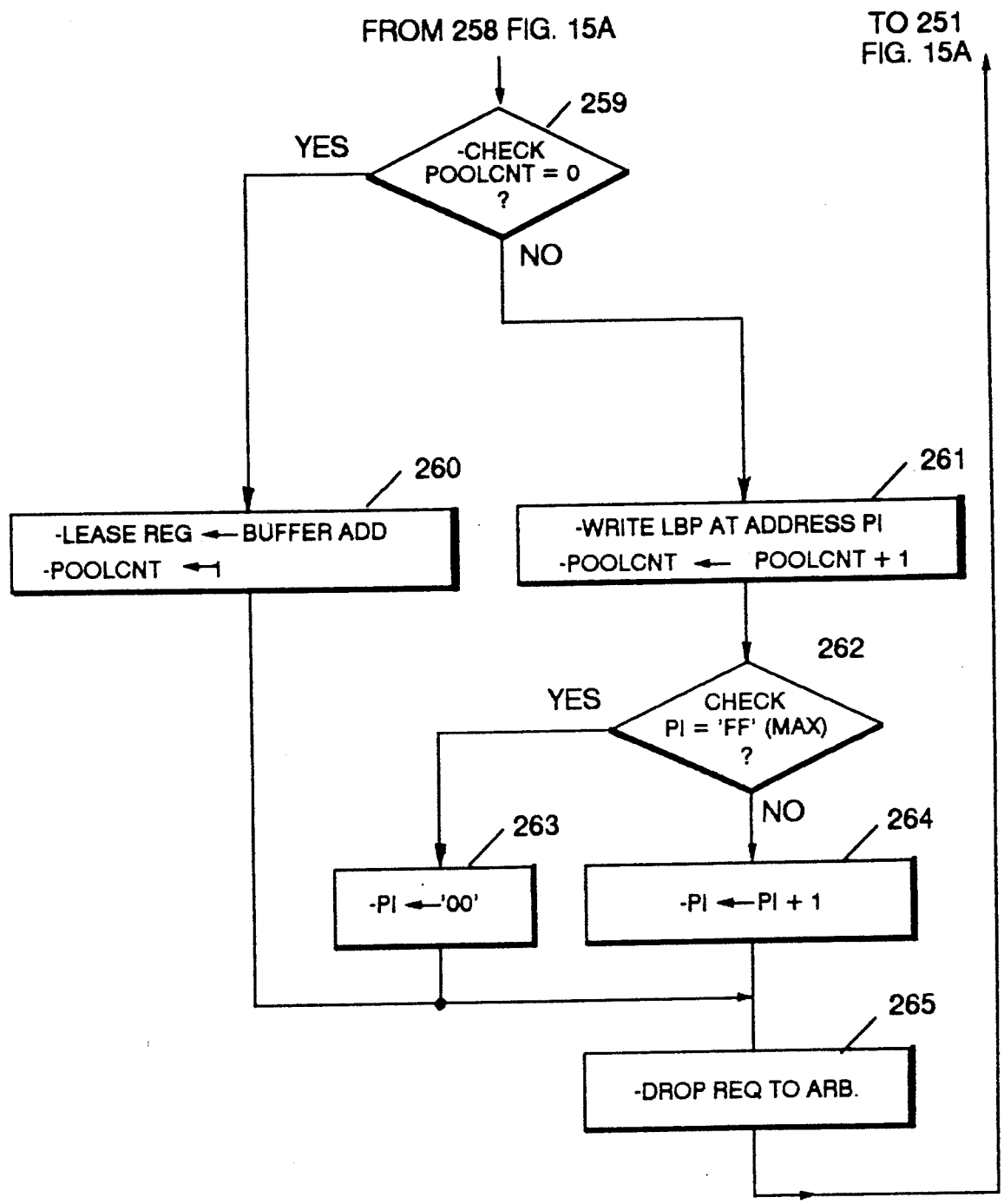

The dequeue free global order is sent by control circuit 202 which is a finite state machine implementing the leased buffer pool loading operation as shown in FIGS. 15A and 15B.

Input/output registers 204 comprise working registers for finite state machine 202 and input/output registers to interface bus 24.

Finite state machine 202 also received through lines 205-L and 205-C the return code: limited threshold reached and critical threshold reached sent by global order machine 90 in the DEQ_FREE global order response which provides an indication of the free buffer queue congestion.

Leased buffer pool is accessed under control of access manager 206, operating under control of counter 208 providing to finite state machine 202, the indication of the number of buffer addresses contained in leased buffer pool 200.

The addresses of leased buffer pool 200 are provided on bus 210, under control of pointer-in and pointer-out registers 212 and 214, as will be explained in reference to FIG. 15B.

Finite state machine 202 raises a bus request to arbiter 28 on line 213 and receives the bus grant signal from arbiter 28 on line 216.

Finite state machine 202 also executes the LEASE global order as will be described in reference to FIG. 16.

It receives the lease request from bus 24 and provides to the requester the address of a buffer which is stored from leased buffer pool 200 into LEASE register 218.

The leased buffer pool loading is described in FIGS. 15A and B. First, (step 250) finite state machine 202 checks whether a lease global order is in progress (step 251). If yes, the process is waiting.

If no, machine 202 checks whether the leased buffer pool is full (step 252).

If yes, the process is resumed at step 251. If no, a DEQ_FREE global order request is prepared and line 214 is raised (step 253).

Grant line 216 is tested (step 254) to check whether free buffer supplier may send the DEQ_FREE request on bus 24.

As soon as line 216 is raised by arbiter 28, the DEQ_FREE request is sent on bus 24 through one register 204 (step 255).

Then, finite state machine waits for the DEQ_FREE response (step 256). When the response is received (step 257) the buffer address and return code are saved into one working register 204.

Then a test is performed to determine whether a lease global order is in progress (step 258). The return code is checked (step 258), if there is a queue congestion, an interrupt signal to interrupt controller in microprocessor 18 is raised (step 259). Also, if the grant signal or the grant response is not received within a given time period, step 259 is entered.

If yes the process waits, if no, counter 208 is checked (step 259). If the buffer count is found equal to 0, the buffer address saved at step 257 is written in lease register 218, and counter is set at 1 (step 260). Then the process proceeds to step 265.

If counter value is found different from zero, the buffer address is written at the address indicated in pointer in register 212, and counter is set to POOL-COUNT +1 (step 261).

Then, it is checked whether pointer in register content is equal to FF, which indicates that the buffer pool is full (step 262). If yes pointer in register 212 is set to 00 (step 263), and if no it is incremented by one (step 264).

Then the global order request line 216 to arbiter 28 is reset, step 265, and the process may resume at step 251.

Finite state machine 202 also processes the LEASE order to provide the address of a free buffer to one user needing a buffer.

The LEASE order process is shown in FIG. 16.

The LEASE request is received from bus 24 and saved into one working register 204 (step 270).

Critical threshold reached indicator in the free buffer queue control block is checked (step 271).

If this indicator is set, which means that the free buffer queue contains a critical number of buffer the LEASE request is accepted only for expedite flow. Thus the expedite flow bit in the LEASE request is checked 272. If it is active or if there is no critical congestion of the free buffer queue FBQ, step 273 is entered.

At step 273, the status of the leased buffer pool is checked, if it is not found empty, step 274 is entered.

At step 274, the return code is generated. The leased buffer pool position at the address provided by pointer out register 214 is read. Counter 208 is decremented by 1 and the content of lease register 218 and the return code are sent on bus 24. Lease register 218 is reloaded with the content of the read leased buffer pool position.

At step 275, it is checked whether pointer out register content is at its maximum value FF. If yes, pointer out register 214 is reset (step 276), if no it is incremented by 1 (step 277).

If it is determined at step 273, that the leased buffer pool is empty or if it is found at step 272 that the expedite flow bit is not active, step 278 is entered.

The return code indicating that the LEASE request is rejected is generated and the LEASE response is sent on bus 24.

Global order machine 90 and free buffer supplier machine 92 are initialized and reset by microprocessor 18 through control messages sent by microprocessor 18 through bus 24 and registers 100 and 204.

The initialization process consists in the following steps achieved by the microcode running in microprocessor 18.

The THRESHOLD fields of the free buffer queue and message queue control blocks are written. the queue maximum buffer count of the message queue control block is written.

The buffered space is formatted by writing the buffer control blocks to chain the buffers in order they form the free buffer queue.

The buffer supplier machine is activated by issuing an FBS active control message. Then the free buffer supplier machine issues 256 DEQ_FREE global orders to fill the leased buffer pool 200.

The machines are reset by means of a reset control message which clears the registers and counter and desactivates the free buffer supplier machine 92.

The logic circuit and finite state machines provided in global order machine 90 and finite state machine 92 are not shown in details. They may be easily implemented by the man skilled in the art from the flow charts describing their functions.

It will now be described how the link inbound queues are built by the adapter interfaces 22, using the same chaining concept, as previously described in reference to FIG. 6.

Data movement receive circuit 86-RCV (FIG. 17) performs the following functions.

It gets inbound data received by the adapter 14, through bus 300.

Circuit 86-RCV comprises a flip/flop buffer interface mechanism, comprising a flip buffer 302 with an associated flip control register 303 and a flop buffer 304 with an associated flop control register 305. Control buffers 303 and 305 keep information to be used to process the flip/flop buffers 302, 304. The maximum capacity of the flip and flop buffers 302 and 304 depends upon the length of the data bursts which are received. It will be assumed that the received data bursts comprise 256 bytes.

It also comprises a finite state machine 306, which performs the transfer of the data from flip or flop buffer 302 and 304 into the memory 10 through multiplex circuit 80, and finite state machine 308 which chains the buffers and messages and enqueues them to build the link inbound queues LIQ's.

The transfer of the messages is made under control of scheduling circuit 310 which times the various operations performed by finite state machines 306 and 308.

At the initialization time, control block (CB) buffer 312 receives the control blocks which contain some control information. These blocks are updated when the data bursts have been transferred into the corresponding link inbound queues. The control block relative to a selected user from which a data burst is transferred into the link inbound queue is stored in CB register 314.

Finite state machines 306 and 308 are shared by several users attached to the adapter. Also, each time they process a specific user data burst, they have to be aware of the state of the control information corresponding to this user.

When machine 306 starts the processing of a data burst, it loads from buffer 312 the corresponding control block into register 314. The address of the control block is provided by an identification field loaded into flip or flop control register 303, 305. It is provided to buffer 312 through address bus 313. The loading of the control block is only done when the user associated to the present data burst is different from the previous one. Then, the content of register 314 is used by machine 306 and updated during the burst processing and when all burst data have been transferred into the link inbound queue, it is saved back into buffer 312. This allows the state of the specific user to be preserved while taking care of the others and to restart in the same conditions when its next burst has to be processed.

The contents of the control block is the following :
Current Message Address (2 bytes) :

Address of the message currently being assembled into memory 10-2. This field is updated by machines 306 and 308 each time it processes the first data burst of a message : this is the address of a free buffer it has obtained from the free buffer supplier machine 92.

Current Buffer Data Store Address (2 bytes) :

Address of the buffer currently used to store message data. At the beginning of a message, this field is initialized with the same value as the message address.

Then, it is updated each time the current buffer is full and a new one is needed to go on storing the data of the current message into LIQ queue.

Message cumulated bytes count (2 bytes) :

Count of bytes already taken in memory 10-2 by the message being received. This count represents the space used in LIQ queue and it may be different from the number of bytes effectively received for the incoming message. For instance, the value of the buffer offsets are included in this count. In fact, this field is used to determine at which address inside the current buffer, the data of the current burst have to be stored. (The 8 least significant bytes correspond to the displacement inside the buffer which can contain up to 256 bytes data).

Offset (1 byte) :

Location (buffer displacement value) where to load the first significant data byte inside the first buffer of a message. It is set by microcode, and must be on a word boundary (multiple of 4 bytes).

Cutoff (1 byte) :

Maximum number of buffers which may be used to store a message. It is set by microcode.

Each time machines 306 needs a free buffer to go on storing a data burst for a given message, it checks to see that it does not go beyond this limit. If this is the case, it closes the message, sets a corresponding error status in the message chaining control block MCCB and sets up the cutoff flush bit in its control block.

Internal Flags (1 bit each):

Message in process indicator: set by machine 306 when it starts a new message (first burst is on and last burst is off). Reset by machine 306 when it completes the process of a message (last burst is on). This indicator is checked by machine 306 when it finds first burst on in order to know if a previous message is still in process, and then to complete it before to start the new one.

Cutoff Flush Indicator:

Set by machine 306 when the number of-buffers required to store a message would overstep the cutoff limit. All next data bursts relating to this message are flushed. Reset by machine 306 when first data burst of a new message occurs. Still referring to FIG. 17, the flip/flop buffer mechanism 302, 304 operates as described hereafter.

In normal operation mode, when adapter 14 has received and assembled a burst of data, it fills it into the flip (or flop) burst buffers 302 or 304 while machine 306 empties the flop (or flip) burst buffer by transferring its content into the link inbound queue. In case both flip and flop burst buffers 302 and 304 are full, adapter 14 has to wait until machine 306 has completed the process of emptying flip (or flop) buffers 302 or 304.

All control information required to process the data burst is passed to a control field associated to each flip and flop buffer 302 and 304 and stored into register 303 and 305.

The content of this flip/flop control field is the following:

User Identification (7 bits):

Loaded by adapter 14 to indicate to which user belongs the data burst.

Burst Ready (1 bit):

Set by adapter 14 to indicate that the corresponding flip/flop buffer is ready for machine 306 to process: data have been loaded and all associated control have been set. Reset by machine 306 when it has transferred all the data in link inbound queue and that the flip/flop buffer is again free to be fed by adapter 14.. When both flip and flop burst ready indicators are on, adapter 14 has to wait until one of them becomes free.

Header or Data Indicator (1 bit):

Set by adapter 14 to indicate that the content of the data burst buffer is to be considered as a "header" and stored in link inbound queue, starting at message byte address zero. When several headers occur during the process of a single message, they overlay each other.

First burst (1 bit):

Set by adapter 14 to tell that the associated burst (header or data) is the first of a new message. It also closes the previous message when this message did not terminate itself by a "last burst". (This allows to two SDLC frames separated by only one or a few flags to be processed efficiently).

Last burst (1 bit):

Set by adapter 14 to indicate that the associated burst (header or data) is the last of the message, circuit 308 will have to close the message, chain it (if needed) to the previous ones and enqueue it in the associated LIQ.

Burst byte count (9 bits):

Loaded by adapter 14 to indicate the number of significant bytes in current burst. For an intermediate burst, it must be a multiple of 4 bytes. For the final data and for a header-type of burst, it may have any value.

Message Status Valid (1 bit):

Set by adapter 14 to indicate that message status field is valid.

Message Status (2 bytes):

Filled by adapter 14 to give information relative to the message under process such as routing information, or to transfer information in parallel with the data. This status is transferred by machine 306 into the message control blocks in memory 10.

Usually, only one status can be transmitted in parallel with a message. In case several status occur, they overlay each other and the last one takes precedence over the previous ones. A message status is not allowed with a single burst message (with first and last burst indicators both on) following a message which does not end with an explicit last burst indicator on. (In such a case, it would not be possible to determine whether the status belongs to the previous message or to the current one).

FIG. 18 represents the state diagram of scheduler 310 from power on reset.

At power on reset time, a flip/flop indicator in data transfer machine 306 points toward the flip burst buffer 302. This activates FLIP INDICATOR line 320 and desactivates FLOP indicator line 321 (step 330).

Machines 306 and 308 are in idle state waiting for the corresponding burst ready indicator to be set by adapter in control flip register 303 (step 331).

It is then checked at step 331 whether the user number has changed, by comparing the user identification in control register 303 or 305 with the control block register 314.

If yes, the new control block is transferred from buffer 312 into register 314 (step 333).

Figure 19B:
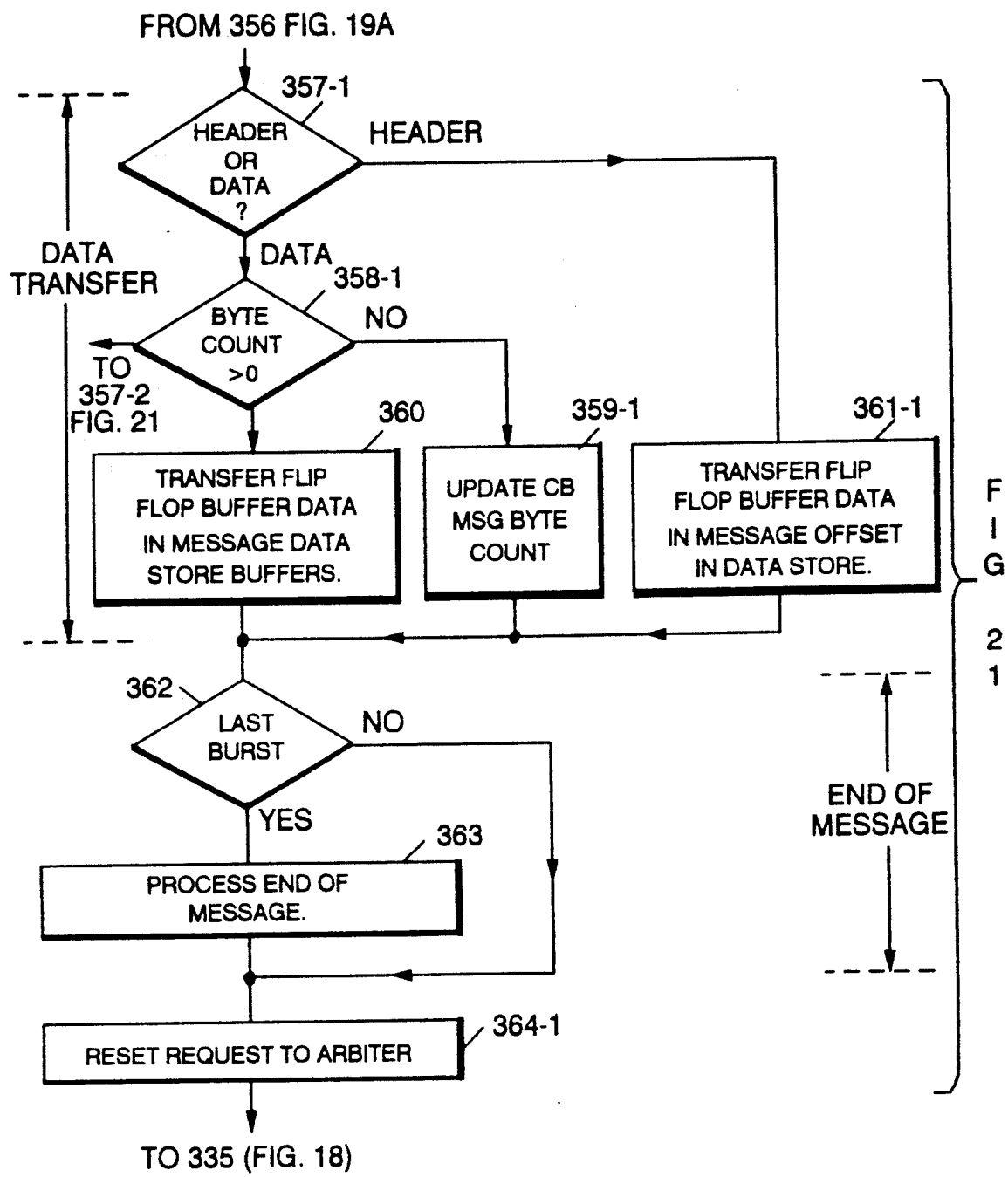

If the user number is not changed or after the loading of the control block, the flip buffer data are processed and transferred into the LIQ queue (step 334) as will be described later on in reference to FIG. 19.

At the end of the process the control block is saved (step 335). The burst ready indicator in flip register is reset (step 336).

Flip/flop indicator is tested (step 337). If it is found equal to FLIP it is changed to FLOP (step 338). If it is found equal to FLOP it is changed to FLIP (step 339). This operates the flip/flop mechanism previously described.

Then the scheduling process is resumed at step 331.

The data transfer operation (step 334) will now be described in reference to FIG. 19.

Four processing phases may have to be executed, depending upon the data burst characteristics:

Start of message phase to initiate a new message and sometimes to close the previous one.

Status phase to transfer status information into the message MCCB.

Header or data phase to transfer header at address 0 of the first buffer or data into the current buffer of the message being built.

End of message phase to close and enqueue the current message onto the corresponding LIQ queue.

Figure 17:
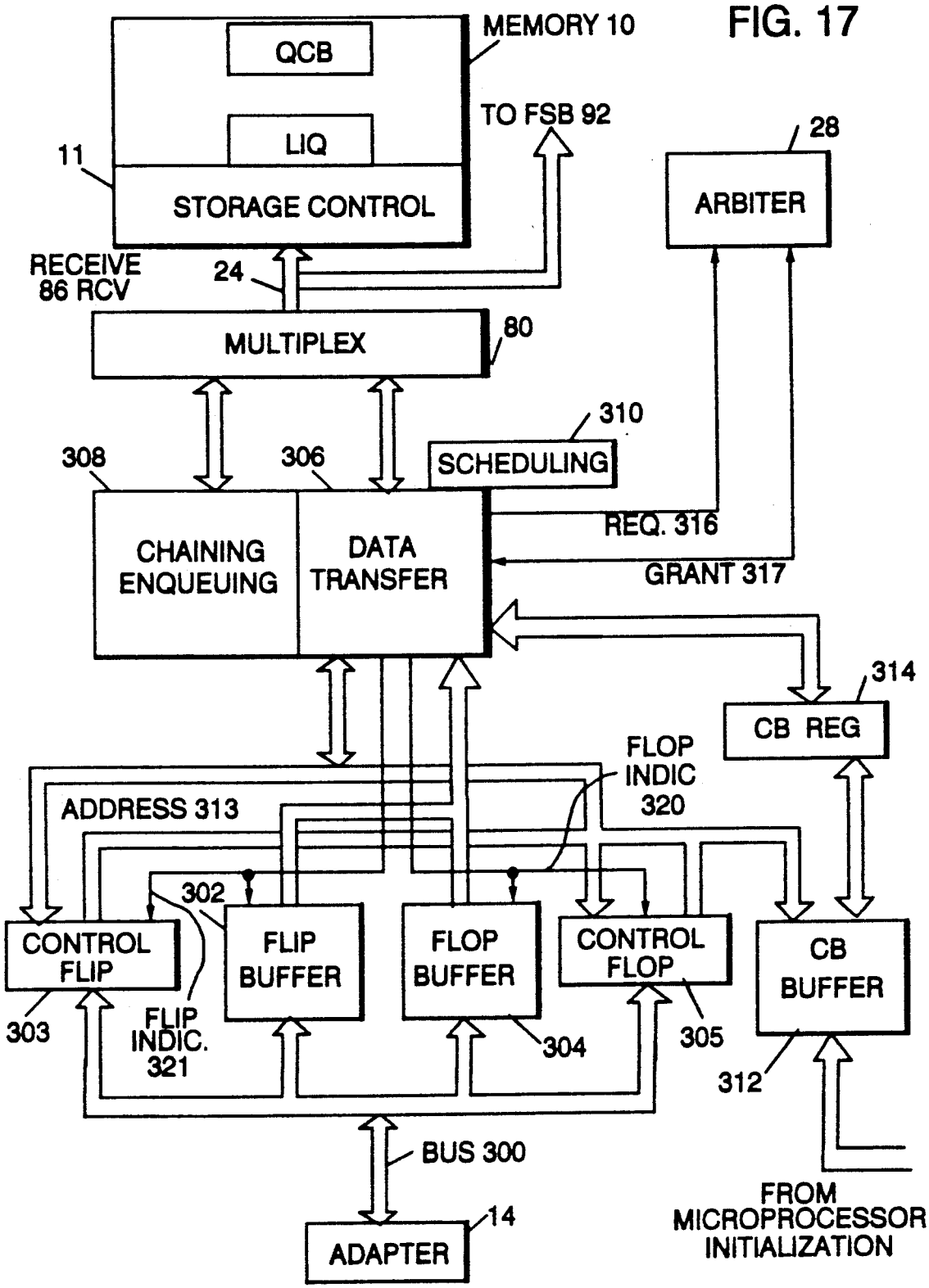
FIG. 17 represents the receive data movement circuit 86_RCV.

During the first step 350 of the start of message phase, finite state machine 306 sets a bus request to arbiter 28 on line 316 (FIG. 17). Arbiter answers with a grant signal on line 317.

First burst bit in control flip or flop register 303 or 305 is checked (step 351).

If it is found set at 1, which means that the first burst of a message is received, it is checked whether the previous message is still in process (step 352) by testing the message in process internal flag in control block register 314. If this flag is set at 1, the processing of the previous message has to be completed (step 353). If this flag is set at 0, or when the processing of the previous message is completed, the processing of the new message is started (step 354). These steps 352 to 354 will be described in reference to FIG. 20.

Then, the message status valid bit in flip/flop control register 303/305 is tested (step 355). If it is found set at 1, the status is processed (step 356). Otherwise step 357 is entered. Step 357 is the first step of the data transfer.

It is first checked whether the received burst comprise HEADER information or data.

If it comprises data, the burst byte count is tested (step 358). If it is lower than 0 the message byte count in CB register 314 is updated (step 359). This will be explained later on in reference to FIG. 21.

Figure 21:
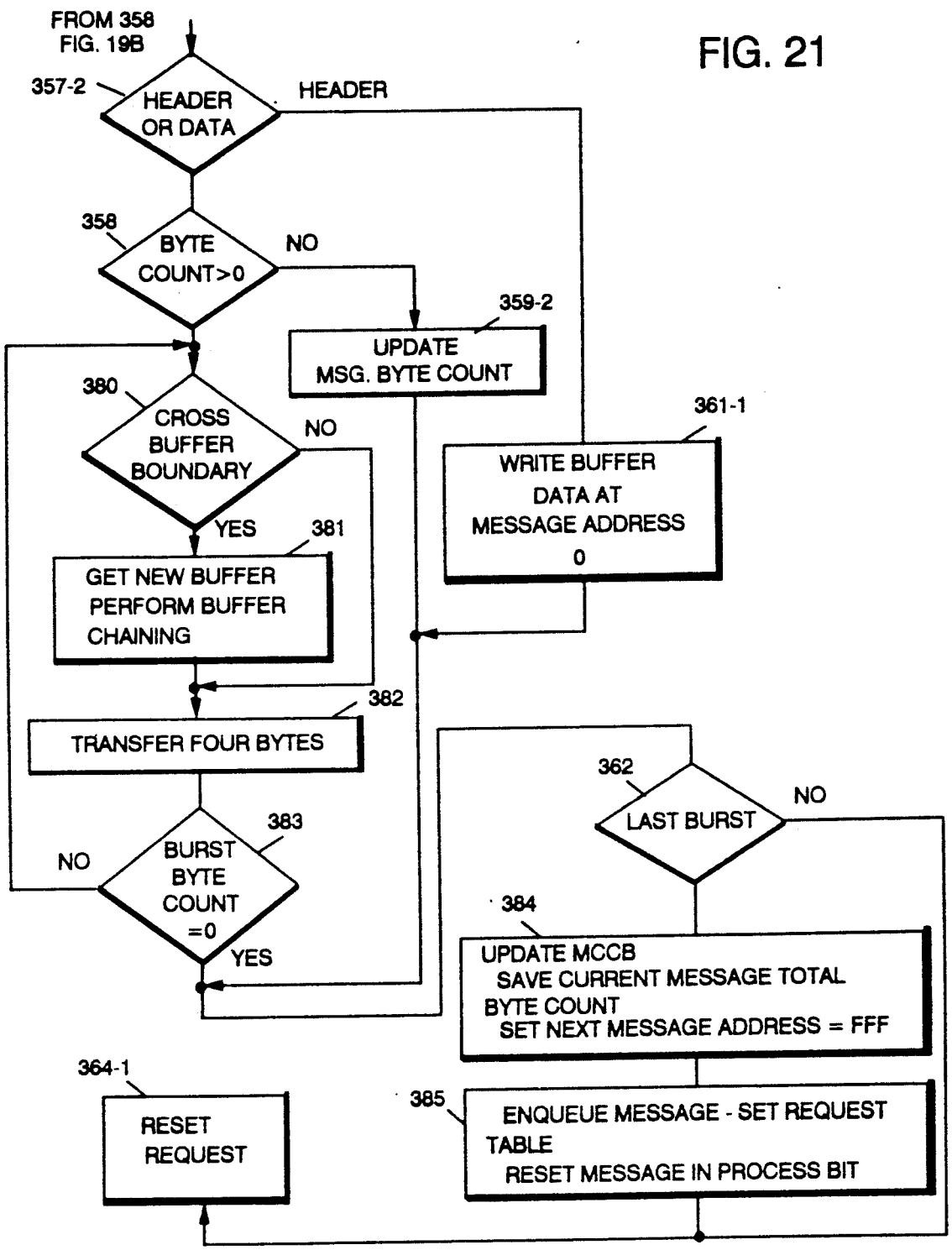
FIG. 21 shows in more details the functions performed in steps 357 to 364 of FIG. 19.

If not, the data burst in flip or flop buffer 302 or 304 is transferred into message buffers in data store memory 10-2 (step 360) as will be described in reference to FIG. 21.

If it is found at step 357, that the burst contains HEADER information, the buffer content is transferred into the memory buffer part at message address 0 (step 361).

Then, it is tested at step 362, whether the received burst is the last burst of the message. If yes, the end of message is processed (step 363) as will be described in reference to FIG. 21. If no, this is the end of the burst process and the request to arbiter 28 is reset (step 362).

Figure 20:
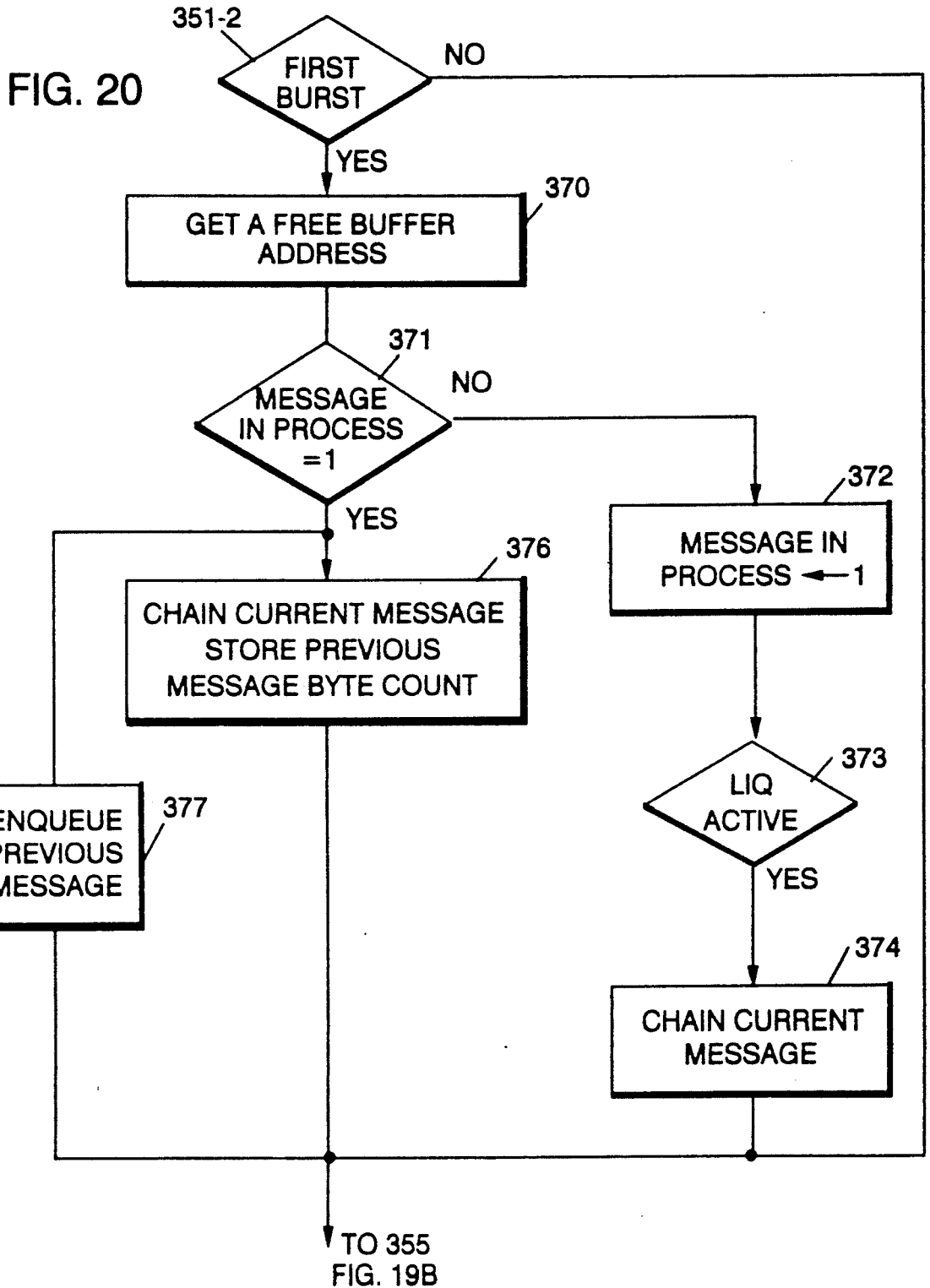
FIG. 20 shows in more details the functions performed in step 352, 353 and 354 of FIG. 19.

The start of message processing is shown in FIG. 20.

At step 351, finite state machine 306 tests whether the received burst was the first burst of a message.

If no, machine 306 goes to the status and header/data processing phase.

If yes, it gets a free buffer address in memory 10, from the free buffer supplier machine 92, by reading the content of lease register 218. The content of this register is saved, step 370.

Then, it checks if there is a previous message still in process for which "last burst" has been received. This is done by testing the message in process bit in register 314 (step 371).

If this bit is found at 0 meaning that the previous message is processed, message in process bit is set at 1 (step 372).

Then machine 306 checks in the request table 89, if the link inbound queue corresponding to the burst user is empty (step 373).

If it is not empty, the current message is chained to the previous one in the LIQ queue (step 374). To perform this operation machine 308 writes the address of the free buffer saved at step 370 into the next message address field of the MCCB block of the last message of the LIQ queue. The address of this last LIQ message is found in the tail field of the QCB block of the queue.

If the previous message is still pending, steps 376 and 377 are entered. Machine 308 stores the total message byte count of the previous message in its MCCB block. At the same time, it performs the new message chaining by writing the address saved at step 370 in the next message address field of the same MCCB block. So only one memory access is requested to write the previous message byte count and to perform the chaining operation. This increases the performances and allows short messages separated by only one flag to be received.

In step 377, the previous message is enqueued onto the corresponding user LIQ.

First step (357) of the data/header data transfers, consists in checking whether the burst contains data or header information. This is performed by checking whether the header/data indicator is at 1 in register 314.

If yes, the burst contains header information and machine 306 transfers them into the assigned buffer at message address 0.

This assumes that there is enough space in the first buffer thanks to the offset mechanism, otherwise the last bytes of the header would overlap the space reserved to the data part of the message. Then, end of message phase is entered at step 362.

If the data/header indicator is at 0, the burst buffer may contain data. Machine 306 checks, if there are data in the burst buffer by checking whether the burst byte count in buffer control register 303 or 305 is positive (step 358).

If no, step 359 is entered. This means that the received burst is the end burst of the previous message and that only the total message byte count has it is updated before to be stored into the MCCB block of the previous message. The burst byte count can be null or negative only if last burst is ON in register 303 or 305 and it cannot be less than minus two. The count can be negative in case the received bytes in the previous burst contained the FCS (frame check sequence) bytes of the HDLC frames.

Then, machine 306 goes to the end of message processing phase.

If the burst byte count is positive, step 380 is entered. This means that there are data to be processed in the burst buffer.

Machine 306 starts a loop to transfer the data burst, four bytes at a time into the data buffer in memory 10.

First, it checks if there is still space in the current data store buffer by testing whether the message byte count in control block register is a multiple of 256 (step 380).

If yes, the current buffer is full and circuit 308 gets a new buffer address by reading lease register of free buffer supplier machine 92, and this buffer is chained to the previous one by updating its BCCB and byte counts (step 381).

If the current buffer is not full or after step 381, the data transfer is initiated. Machine 306 transfers 4 data bytes from buffer 302 or 304 into the memory 10 at the address computed from the current buffer data store address in control block register 314 and the number of bytes already transferred, (step 382).

Machine 306 decrements the remaining burst byte count in flip/flop control register 303/305 and increments the message cumulated byte count in control block register 314.

Burst byte count is tested at step 383. If it is found different from 0, step 380 is entered.

If it is equal to 0, the end of message phase is entered.

If it is found at step 362 that the processed burst is the last burst of a message, circuit 308 has to close the message by updating its message chaining control block, (step 384). It stores the total message byte count and sets the next message address to FF to indicate that this message is the last one which has been received for this user and that there is not yet a next one under process.

Then, (step 385) the message being completed it can be enqueued into the LIQ corresponding to the user associated to this message. This is done by an enqueue global order, which has the highest priority.

The message in process bit is reset in control buffer 314.

To implement the functions as described in FIGS. 18 to 21, finite state machines 306, 308 FIG. 17 needs to access bus 24 to write data into memory 10 or to read a free buffer address from the lease register 218. In both cases, circuit 306 has to request the bus from arbiter 28.

This is done by to the bus request which is set on line 316 when machines 306, 308 need to access bus 24, and reset by these circuits when they do not need the bus anymore. The bus grant signal on line 317 is set by arbiter 28 to grant the bus to machines 306 and 308 and reset by arbiter 28 after the request signal has been reset.

The interface between the station service 88 and circuit 86_RCV is done through the request table, which contains information to schedule the station service, as will be described later on.

Figure 22:
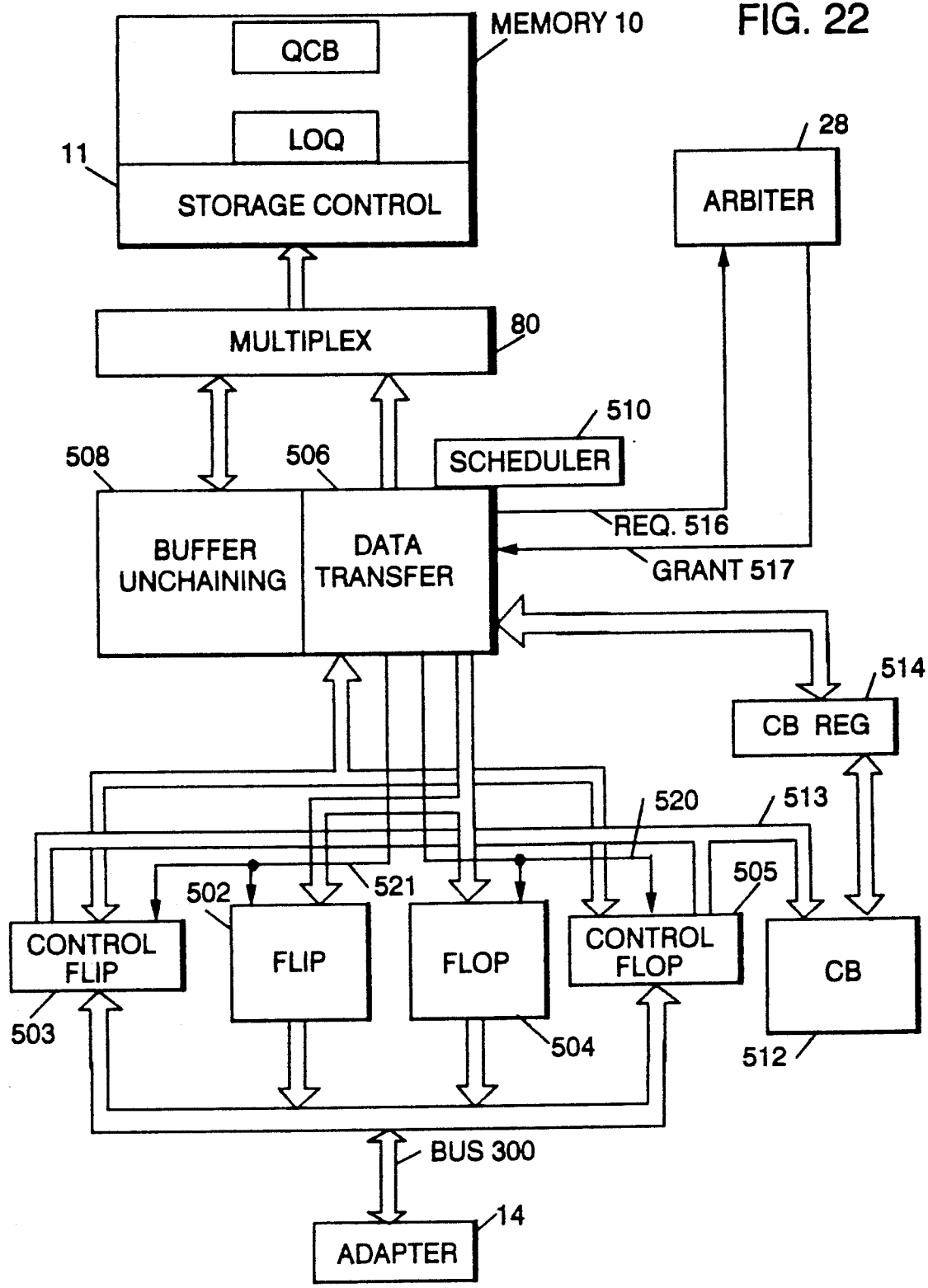
FIG. 22 represents the transmit data movement circuit $86_{13}$XMIT.

Data movement transmit circuit 86_XMIT (FIG. 22) performs three main functions :

it gets formatted data from a message previously dequeued from a LOQ by station service 88 located in the link outbound queues, it transfers these data to the adapter through a flip/flop mechanism upon adapter request.

This circuit 86_XMIT has a structure similar to the structure of the data movement receive circuit 86_RCV.

It comprises flip buffer 502 and flop buffer 504 with associated control registers 503 and 505. The maximum capacity of the flip and flop buffers 502 and 504 depends upon the length of the data bursts, i.e. 256 bytes in a preferred embodiment.

Control registers 503 and 505 keep information to be used to process the flip and flop data buffers 502 and 504 respectively.

Circuit 86_XMIT comprises finite state machines 506 and 508. Machine 506 controls the data transfer from the link outbound queues into one buffer 502 or 504 and machine 508 manages the unchaining process.

Scheduling of the operation of machine 506 and 508 is performed under control of scheduler 510.

Circuit 86_XMIT is shared by several users in the same way as circuit 86_RCV. Also, each time it processes a specific user data burst, it must be aware of the state of the control information corresponding to this user. This is done via the control blocks located in buffer 512. When circuit 86-XMIT starts the processing of a data burst, it loads the corresponding control block from buffer 512 into register 514.

The address in buffer 512 of the control block is provided by bus 513 from the user identification field in control register 503 or 505. This loading is done only when the user associated to the present burst is different from the previous one. Then, the content of register 514 is used by finite state machines 506 and 508 and is updated during the data burst processing when all burst data have been transferred from the data store memory 10. The contents of register 514 is saved into buffer 512. This allows the system to keep the state of the specific user while taking care of the others and to restart in the same conditions when its next burst has to be processed. For each user the following information must be saved :

Current Message Data Store Address (2 bytes) :

Address of the message currently being transferred from memory 10. This field is loaded by station service 88 each time it has dequeued a new message (this can be done only when the busy bit is off in the request table for the corresponding user, as will be described later on in reference to FIG. 26).

Current Data Store Buffer Address (2 bytes) : Address of the buffer from which data are currently being transferred towards the flip/flop buffer 502/504.

At the beginning of a message, this field is initialized with the same value as the message address. Then, it is updated each time that the current buffer has been emptied and that the next one of the message chain is unchained to get the next data.

Message bytes count (2 bytes) :

Initialized at the beginning of a message transfer with the count of bytes used to store the full message in data store. This count is taken from the MCCB. It must be noticed that it represents the space used in data store and that it may be different from the number of bytes to be effectively transmitted for the outgoing message. For instance, the value of the buffer offsets are included in this count.

This count is decremented by 256 each time a new buffer is unchained. When it becomes less than 256, machine 506 sets the last buffer flag, that means the last buffer of the message is transferred and that it contains the number of remaining bytes to transfer.

Buffer byte count (1 byte) :

Total number of bytes used in the current buffer. Loaded each time a new buffer of a message is unchained.

Buffer displacement (1 byte ) :

Address, inside the current buffer, of the next byte to transfer. Each time a new buffer of a message is unchained, the buffer displacement is loaded with the offset read from the BCCB. Then it is decremented each time data are read from this buffer.

Header size (1 byte) :

Number of bytes starting at message address 0 to be processed as header type of data.

Set by microcode at user initialization time.

Internal Flags (1 bit each)

Last buffer :

Set by machine 506 when the message byte count becomes less than 256.

Reset by machine 506 when it starts the process of a new message.

Message in process :

Set by machine 506 when it starts to process a message.

Reset by machine 506 when it transfers the last burst of the message. Buffer header :

Set by microcode at user initialization time.

Indicate that there is message header information at message address 0 (address 0 of the first buffer of the message). This information must be transmitted to adapter as the first burst with the burst header control flag on.

In normal operation mode, when adapter 14 has requested a burst of data by setting burst request flag and loading the user identification field in the flip or flop control register 503 or 505, machine 506 fetches the data from the data store memory 10 and transfers them into flip (or flop) burst buffer 502 (or 504). Then it sets in the associate flip (or flop) control register 503 (or 505) all the information needed by the adapter to transmit the data burst, and it resets the burst request flag to indicate that the burst is ready.

The control information in flip (flop) control registers 503 (505) are described hereafter. This information is set into these registers from machine 506 through bus 507 or from adapter through bus 300.

User Identification (7 bits) :

Loaded by adapter to indicate for which user it requests a data burst, this field is provided to bus 513 for addressing buffer 512.

Burst request :

Set by adapter to indicate that it requests a data burst for the user indicated in the user identification field.

Reset by machine 506 when it has transferred all the burst data from the LOQ queue into the flip or flop register 502 or 504 and that all the associated control fields have been updated in the associated control register 503 or 505.

Initialized into inactive (reset) state.

Header or Data Indicator (1 bit) :

Set by machine 506 to indicate that the data burst buffer contains "header" type of information, (a "header" burst can only be the first of a message).

First burst (1 bit) :

Set by machine 506 to tell that the associated burst (header or data) is the first of a new message.

Last burst (1 bit) :

Set by machine 506 to indicate that the associated burst is the last of the message.

If a message can be transferred in a single burst, both "first burst" and "last burst" indicators are set.

Burst byte count (9 bits) :

Loaded by machine 506 to indicate the number of significant bytes in the associated data burst.

Message Status Valid (1 bit) :

Set by machine 506 to indicate that message status field is valid.

Message Status (2 bytes) :

Filled by machine 508 from the message MCCB status field (if any), in parallel with the first burst of the message.

Circuit 86_XMIT is slave of the attached adapter, it is scheduled when the adapter requests data by setting the burst request flag in the flip (flop) burst buffer control register 503 (505).

Figure 23:
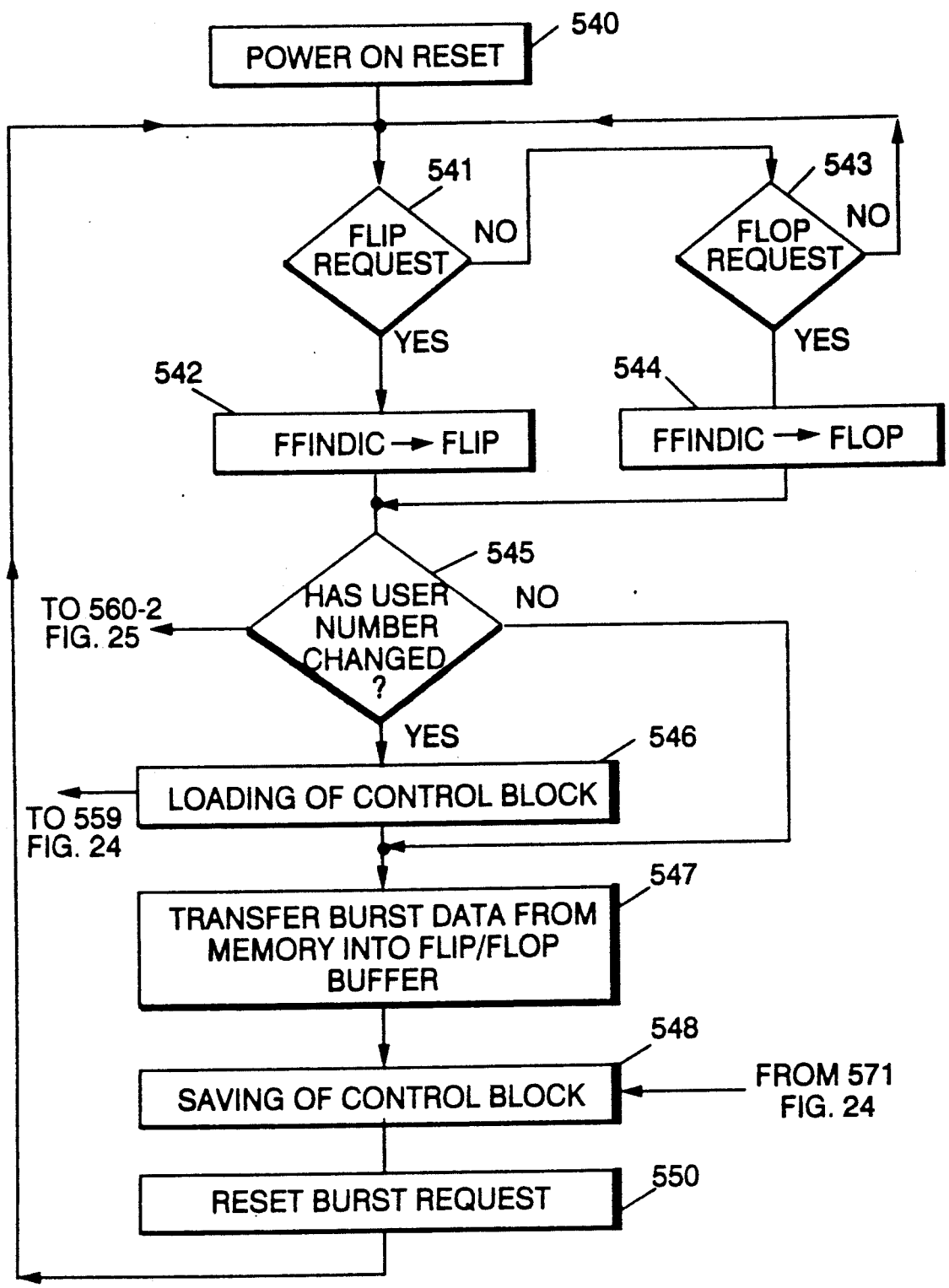
FIG. 23 shows the functions performed by logic 506 and 508 for transmitting data bursts to the destination user.

The scheduling flow chart is shown in FIG. 23.

At power on reset time (step 540) both burst request flags are reset (inactive) in the flip/flop control registers 503/505. The flip/flop indicator FF_INDIC points towards the flip burst buffer 502 so that line 521 is activated and line 520 is inactive.

Machines 506 and 508 are in idle state waiting for the flip or flop burst request bit to be set by the adapter in flip or flop control register 503 or 504 (steps 541 to 544).

When this happens, the user identification field in flip or flop control register 503 or 505 is compared with the content of the control block register saved at the end of the processing of previous burst to determine at step 545 whether the user number has changed.

If yes, the control block corresponding to the new user is loaded into register 514 from buffer 512 (step 546).

Then, the data burst is transferred into the flip or flop register 502 or 504, depending upon which line 521 or 520 is activated (step 547). The data transfer operation will be explained later on.

At the end of the burst transfer the content of register 514 is saved (step 548) and the burst request bit is reset.

Machines 506 and 508 go back to their idle state, looking for the flip or flop burst request indicator to raise.

Figure 24:
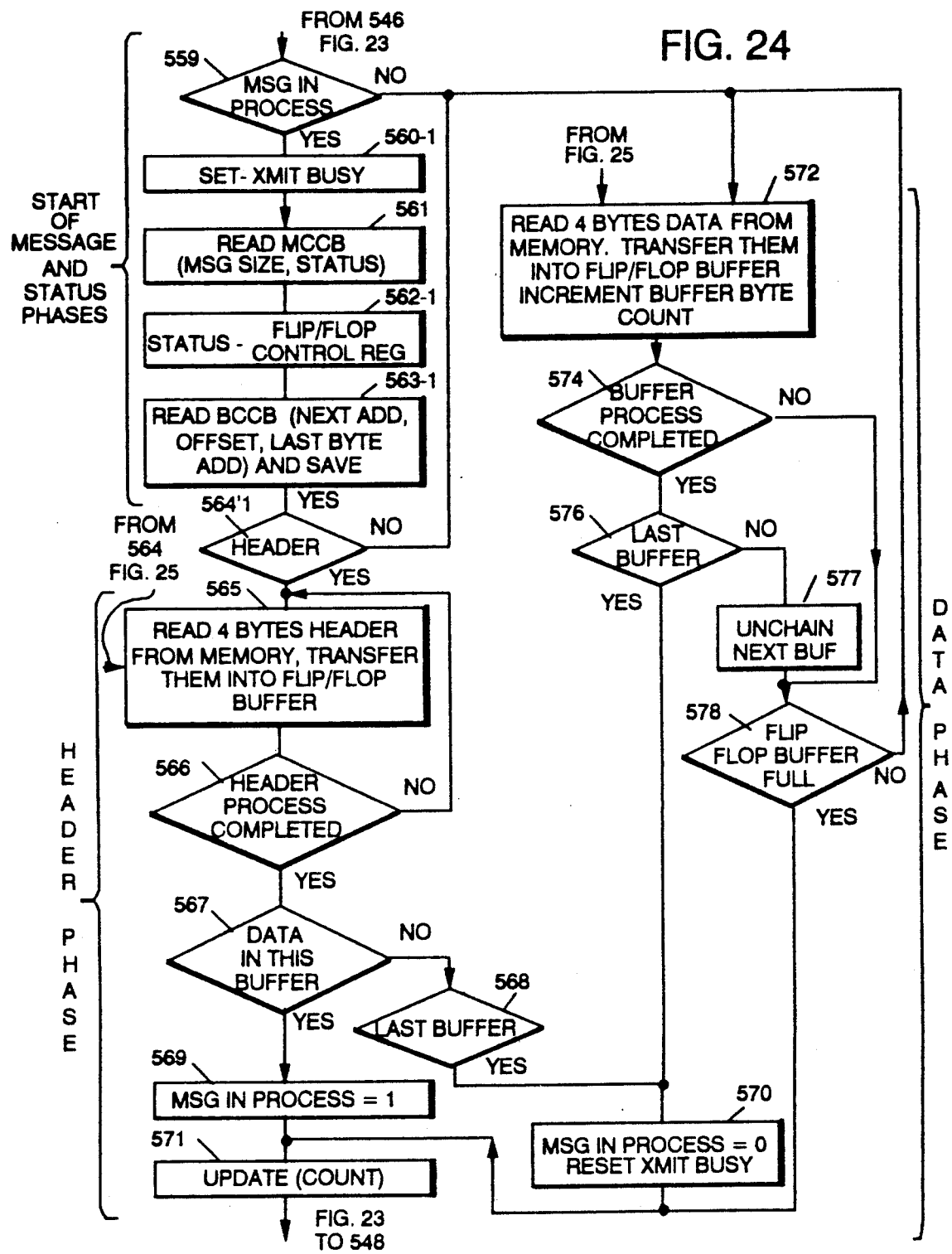
FIG. 24 shows the functions performed in step 347 of FIG. 23.

Transfer burst data step 547 is described in reference to FIG. 24.

Different processing phases may have to be executed depending upon the status of machine 506 and of the message characteristics given by the message chaining control block MCCB.

There are first, a start of message phase and status phase which comprises steps 560 to 563. At step 559, machine 506 tests whether the message in process bit in control block register 514 is at 0. If yes, bit 86_XMIT BUSY in Request table 89 is set (step 560). Then, the MCCB block of the new message is read, to get the message size and status (step 561). The status is written into the flip or flop control register 503 and 505 (step 562) and the BCCB block is read to get the next buffer address, the offset value and the last byte address.

Then machine 506 tests whether the buffer header bit in register 514 is on (step 564).

If there is header information to be processed, step 565 is entered. Four header bytes are read from the memory buffer and transferred into the flip or flop buffer 502 or 504.

Then it is tested whether the header process is completed (step 566), step 565 is entered and the process is resumed until the header information is completely transferred into flip or flop buffer 502 or 504.

Then, it is tested whether there are data in the current buffer (step 567). If yes, message in process bit in register 514 is set to 1. If no, machine 506 tests whether last buffer bit is set in register 514 (step 568).

If last buffer bit is not set or there are data in the current buffer, message in process bit is set in control block register 514 (step 569).

If last buffer bit is found on, message in process bit is set to 0 (step 570).

After step 569 or 570, the buffer byte count in flip or flop register 503 or 505 is updated (step 571).

If machine 506 determines at step 564, that the buffer does not contain header information but data, step 572 is entered. Four data bytes are read from the buffer and transferred into flip or flop buffer 502 or 504, the buffer byte count is incremented.

Each time four bytes are transferred, machine 506 tests whether all the buffer data have been processed (step 574).

If yes, machine 506 tests whether the buffer being processed is the last buffer of the message (step 576), this is indicated by the next buffer address read from the BCCB and saved at step 563.

If this is the last buffer, step 570 is entered to set the message in process bit at 0 and reset 86_XMIT BUSY bit in request table 89.

If this is not the last buffer, the next buffer is unchained (step 577) its BCCB block is read and saved.

Then machine 506 tests whether the flip or flop data buffer 502 or 504 is full (step 578), if yes step 571 is entered to update the flip/flop buffer count in control register 503 or 505.

If no, step 572 is entered to transfer the content of the next buffer.

Figure 25:
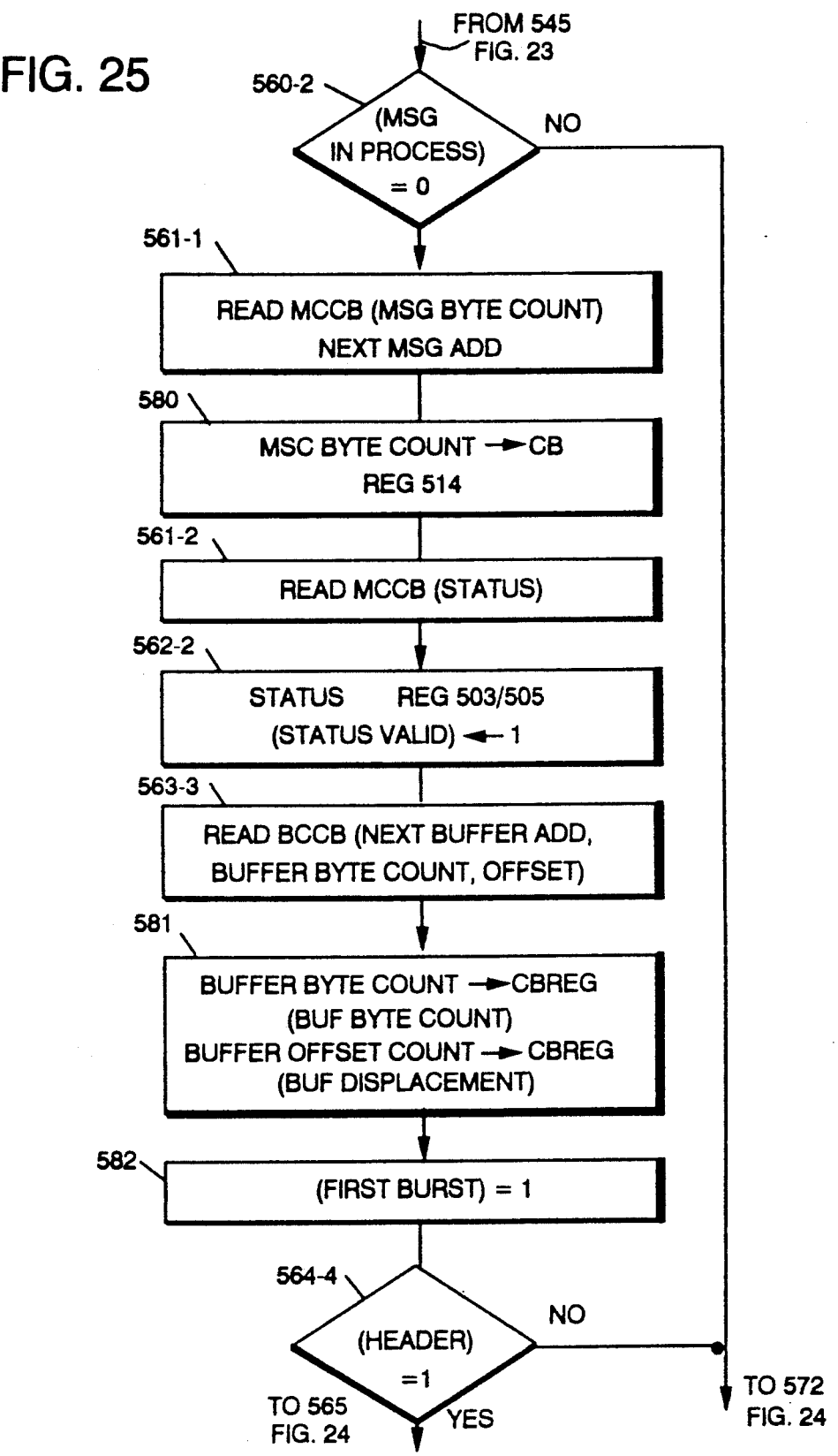
FIG. 25 shows the functions performed in steps 560 to 564.

The start of message phase is detailed in FIG. 25.

If message in process bit is found equal to 0 in control block register 514, the MCCB block of the message at memory address computed from the current message data store address in register 514, is read. The message byte count and next message address are saved (step 561-1). The next message address will be written into the control block register to be saved in buffer 512 (step 548, FIG. 23) when the message is transferred.

The message byte count is written into register 514 (step 580).

The MCCB status is read (step 561-2) and step 562 is entered.

The status is written into flip or flop control buffer 503 or 505 and status valid bit is set to 1.

Then, the buffer chaining control block BCCB is read and saved (step 563).

Buffer byte count read at step 563 is written into register 514 in the buffer byte count field and the buffer offset is written in the buffer displacement field; to control the addressing of the bytes to be read from the buffer (step 581). Then the first burst bit in flip/flop control register 503/505 is set to 1 (step 582) and step 564 is entered.

Then the header or data are transferred as described in FIGS. 23 and 24.

According to the present invention, the messages received from one source user 12 are chained and enqueued into the user link inbound queue.

Then, the station service RCV dequeues the messages, and depending upon the MCCB status/field parameters content of each message causes the messages to be enqueued in the destination link outbound queue corresponding to the destination user to be transferred by the circuit 86_XMIT to the user, when the message processing does not need microcode operations. In that case a "hardwired routing" bit has been found active in the message chaining control block together with the QCB_id identification of the user link outbound queue.

When the message processing needs microcode operations, the messages are enqueued in the microcode inbound queue of the source user. The microprocessor by issuing a DEQ global order, gets the messages, processes them and issues an ENQ global order, to enqueue them in the destination link outbound queue to be transferred to the destination user.

Figure 26:
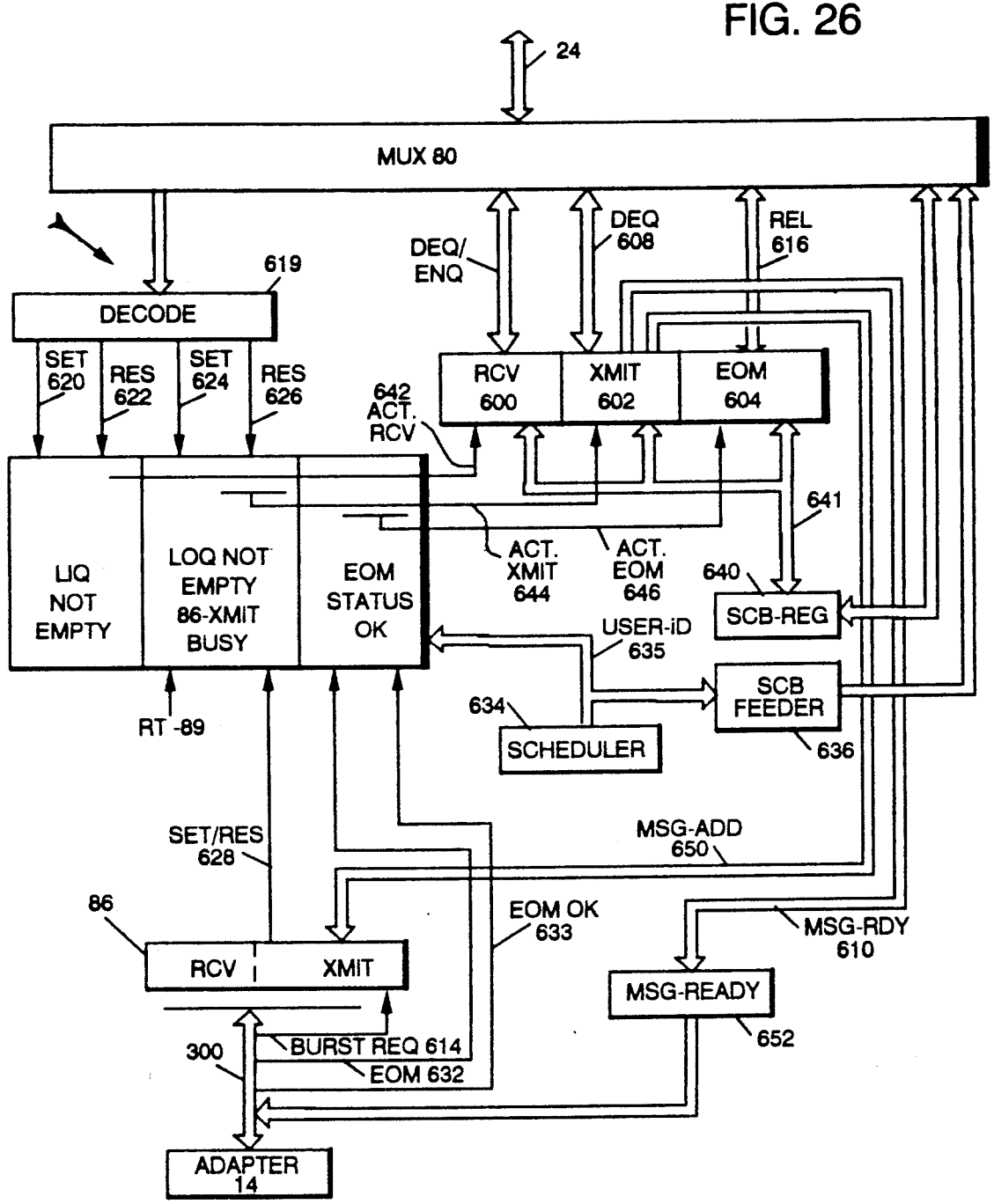
FIG. 26 shows the station service circuit 88.

FIG. 26 represents station service 88 which is located in each interface 22 to process one user at a time either to receive, transmit or process the end of transmission of a message.

It is made of three parts, namely the receive logic part RCV600, the transmit logic part XMIT602 and the end of message part EOM604. These parts are devoted to the receive, transmit and end of message transmission processes.

Each of these parts may issue global orders to the global order machine 90 through multiplex 80 and bus 24.

Receive part 600 may issue DEQUEUE global orders and ENQUEUE global orders through bus 606.

XMIT part 602 may issue DEQUEUE global orders through bus 608. It may also issue a message ready information through bus 610 which is stored in register 652 to be provided to adapter 14 to inform the adapter that a message for a specific destination user is ready.

The adapter generates the burst request to data movement transmit circuit 86_XMIT on line 614 in response to the message ready information in register 652.

End of message transmission part 604 may issue RELEASE global order on bus 616 to release the message buffers to the free buffer queue at the end of the message transmission.

Request table 89 has one entry per user and comprises for each user status bits which causes the receive, transmit or EOM part to be activated.

For each user, the receive status bit is set by the enqueue global order return code (step 126, FIG. 10B) requested by circuit 86_RCV, by activating line 620. This bit indicates that the user LIQ is not empty. It is reset by dequeue global order return code when the queue becomes empty by activating line 622.

For each user, the transmit status bit are : LOQ not empty bit and 86_XMIT busy bit.

LOQ not empty bit is set from the ENQUEUE global order return code by activating line 624 when a first message is enqueued into the user link outbound queue and it is reset from the DEQUEUE global order returncode when the user link outbound queue becomes empty by activating line 626.

86_XMIT busy bit is set by circuit 86_XMIT when the burst request is raised by adapter 14 and reset by circuit 86_XMIT when the last burst is sent to adapter as previously described, through line 628.

Decode circuit 619 receives the global order response activate lines 620, 622, 624 and 626, as the case may be.

For each user, end of message transmission bit is activated by adapter 14 by raising line 632 of bus 300, and Status OK bit is set by adapter when the message has been successfully received through line 633.

Scheduler 634 scans request table 89, and for each user it checks the status bits to determine whether the station service must be scheduled to receive a message (LIQ not empty bit ON AND XMIT BUSY BIT OFF), or transmit a message (LOQ not empty bit ON) or process an end of message (EOM bit and Status OK bit ON).

A station control block SCB in linear space of memory 10 is assigned to each user and contain the QCB_id of the inbound queues and link outbound queues of the user.

Lines 642, 644 and 646 are activated by the LIQ not empty bit, LOQ not empty bit and EOM bit read from request table.

The scheduler 634 scans the request table. For each user it reads the status bits in the following order, receive, transmit and EOM, to determine first if receive part second if XMIT part and third if EOM part has to be activated. If it is the case, it activates one of this lines 642, 644 and 646.

It causes SCB feeder 636 to generate the address of the corresponding SCB block. The address is sent to memory controller 11 through bus 638 and multiplex circuit 80, and the SCB block data read from memory are stored in register 640 to be provided through bus 641 to the receive, transmit or end of message part 600, 602 or 604, pending upon which lines 642, 644 or 646 is activated.

The operation is the following.

When activated, RCV Part 600 issues a DEQ global order. The request data is the QCB_id of the LIQ queue stored in register 640 as described before, and the response data is the message address read from the head field of the LIQ queue control block.

Then, circuit 600 sends an ENQ request, request data are the message address, a microcode inbound queue QCB_id or link outbound queue QCB_id, depending upon the MCCB content and returns control to the scheduler 634.

If the message is enqueued in a microcode inbound queue, it will be dequeued and processed by the microcode and then enqueued in the link outbound queue of the destination user.

When activated, XMIT part 602 sends a DEQ global order is sent on bus 608, the request data is the QCB_id of the link outbound queue which is stored in register 640.

The message address which is received in the response data field is sent through bus 650 to be stored in the control block buffer 512 of circuit 86—XMIT, at the user address to be used for sending the message and is saved in the SCB block.

Also, register 652 is loaded with a signal indicative that a message for this user is ready. Transmit part 602 returns control to scheduler 634. The adapter initiates the burst request therefrom.

When activated, the EOM part 604 sends a REL global order, the request data is the message address previously saved in the SCB block. This allows the message buffers to be released to the free buffer queue when the message has been successfully received. The EOM part 604 returns control to scheduler 634 which scans next user.

We claim:

1. A mechanism for transferring messages between source users and destination users in a communication system through a shared memory, which is accessed by the users through a common bus (24), said mechanism comprising:

the shared memory (10) organized into a linear space (10-1) and into a buffered space (10-2), where the buffered space is partitioned into data buffers and the linear space comprises queue control block (QCB) with each queue control block dedicated to each one of the source users or the destination users;

buffer control blocks located in the buffered space with each one of the buffer control blocks associated with each one of the data buffers, said each one of the buffer control blocks comprising a buffer chaining part (BCCB) which is devoted to the storing of information indicative of the address of the next buffer of a buffer chain storing one message, the buffer chaining part (BCCB) of the last buffer of said chain being set to a fixed value indicating that the buffer is the last message buffer;

a message chaining part (MCCB) which has a significant value only in the buffer control block of the first buffers of the chains containing one message, said part being devoted to the storing of information indicative of the address of the next buffer containing the next message, the message chaining part (MCCB) of the first buffer of the chain containing the last message being set to a fixed value;

at least one free buffer queue;

at least one buffer control block for storing an address for a next buffer in said at least one free buffer queue;

a free queue control block (FQCB) being devoted to said at least one free buffer queue to store the address of the first buffer of the free buffer queue as head information and of the last buffer of the free queue as tail information, so that buffers may be taken from the buffered space to store incoming messages by dequeuing buffers from said free buffer queue, which is done by updating the head information with the address of the next free buffer and chaining the dequeued buffers to the inbound message queues and enqueuing said buffers to said inbound message queues by updating the corresponding queue control blocks;

message receiving means (86 RCV, 88) coupled to source users for receiving messages; said message receiving means comprising:

a user buffering means (302, 304) coupled to the users, said user buffering means for storing message bursts from the source users;

transfer control means (303, 305, 308) which take free buffers from the free buffer queue, transfer the received bursts into the buffers, chain the message buffers by updating the buffer message chaining, part and buffer chaining part of the buffers as long as successive bursts are received to build the link inbound queues and update the corresponding queue control block with the queue head and queue tail information, arbitrating means (28) for issuing grant signals in response to bus requests from users;

centralized control means (26) responsive to the grant signals to process enqueuing orders or dequeuing orders from the users;

the enqueuing orders causing chained messages to be enqueued to a message queue by updating the queue control blocks of said message queue, in response to a message address which is the address of the first buffer containing the message and the queue control block identification contained in the enqueuing request sent by the user to the central control means;

the dequeuing orders causing messages to be dequeued from a message queue identified in the dequeuing request sent by the user to the central control means, which provides the message address contained in the queue control block or said message queue to the user in response thereto, so that the user may process the messages contained in said queue;

at least one microprocessor which runs a communication control program is attached to the common bus (24) and has access to the shared memory characterized in that the microprocessor is associated to a number o microcode inbound queues (MIQ) equal to the number of input users, the microprocessor sending enqueuing orders to a centralized control means causing the messages contained in the inbound message queue of a user to be enqueued into the corresponding microcode inbound queue, the microprocessor sending dequeuing orders to a centralized control means to get messages, process them and route then on the outbound message queues of the destination users by sending enqueuing orders relative to said queues;

first means (RCV600) for reading the queue control blocks of the source users and means (Xmit602) coupled to the first means for using information read from said queue control blocks to modify the queue control blocks to the destination users whereby outbound message queues (LOQ) are built the contents of which is read to be transferred to the destination users.

* * * * *